United States Patent [19]

Ise et al.

[11] Patent Number: 4,805,102
[45] Date of Patent: Feb. 14, 1989

[54] METHOD FOR CONTROLLING A VEHICLE ATTITUDE

[75] Inventors: Kiyotaka Ise; Harumasa Minegishi; Hiroshi Harada, all of Susono, Japan

[73] Assignee: Toyota Jidosha Kabushiki Kaisha, Toyota, Japan

[21] Appl. No.: 8,326

[22] Filed: Jan. 29, 1987

[30] Foreign Application Priority Data

Jan. 30, 1986 [JP] Japan ................................. 61-18893
Sep. 20, 1986 [JP] Japan ............................... 61-222317

[51] Int. Cl.$^4$ ............................................. B60G 17/00
[52] U.S. Cl. ............................... 364/424.05; 280/707; 364/426.02
[58] Field of Search ................ 364/424, 426; 280/707; 303/103, 105, 110, 112

[56] References Cited

U.S. PATENT DOCUMENTS

| | | | |
|---|---|---|---|
| 3,942,845 | 3/1976 | Levering | 303/112 |
| 4,616,163 | 10/1986 | Kanai et al. | 280/707 |
| 4,616,848 | 10/1986 | Sugasawa et al. | 280/707 |
| 4,621,832 | 11/1986 | Nakashima et al. | 280/707 |
| 4,686,626 | 8/1987 | Kuroki et al. | 364/426 |

Primary Examiner—Gary Chin
Attorney, Agent, or Firm—Oblon, Fisher, Spivak, McClelland & Maier

[57] ABSTRACT

An effective vehicle attitude control method in which the abrupt change of the vehicle attitude due to the acceleration slip control can be quickly controlled. When the slippage of a drive wheel is determined to be greater than a predetermined value, the drive force of the drive wheel is controlled and, at the same time, the suspension characteristic is altered to a harder state. For preferentially keeping maneuverability and riding comfort, the altered suspension characteristic may be restored to the original state when a preset time period has passed.

10 Claims, 23 Drawing Sheets

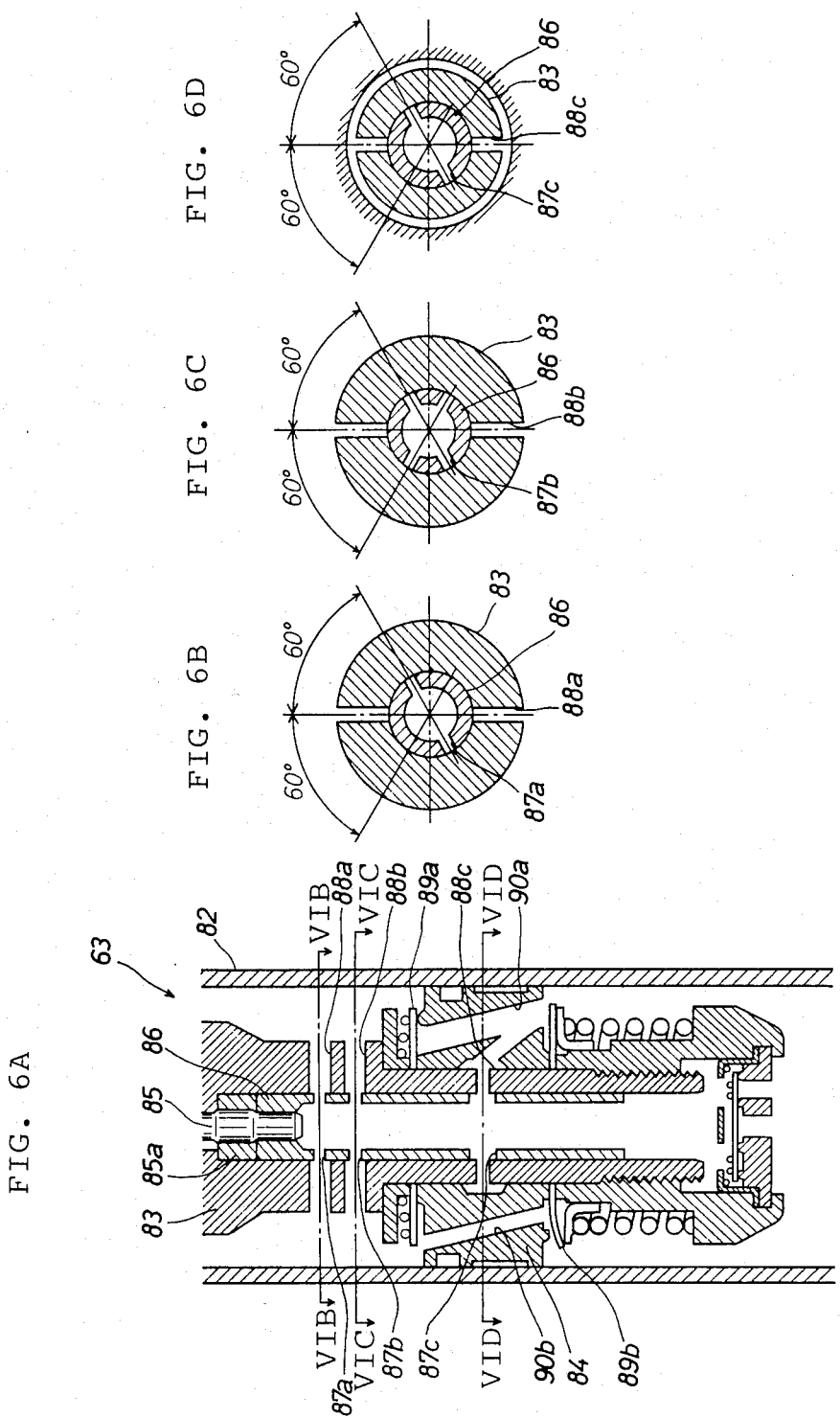

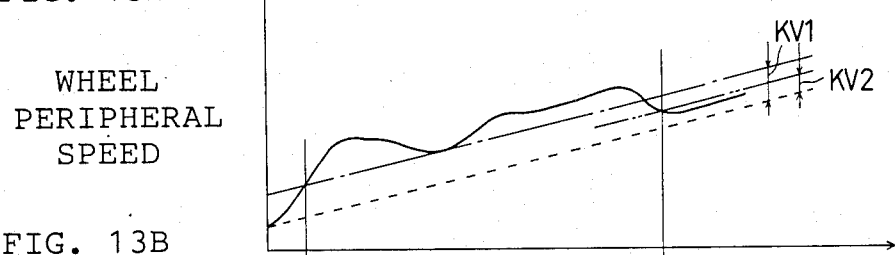
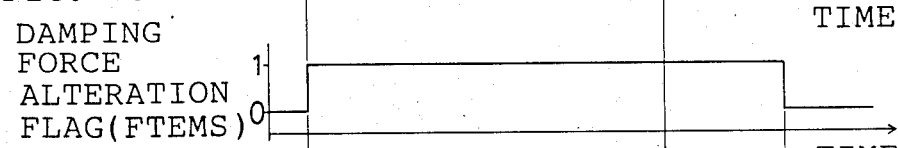
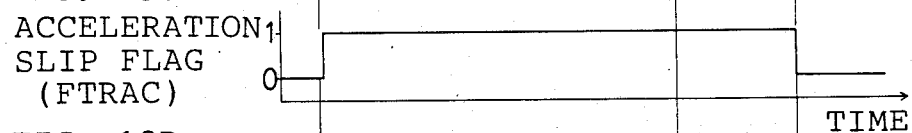
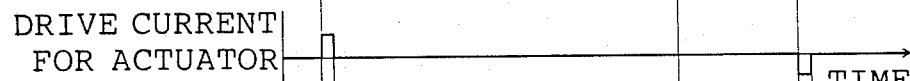
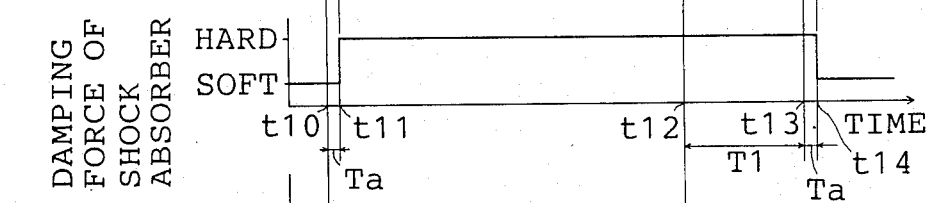
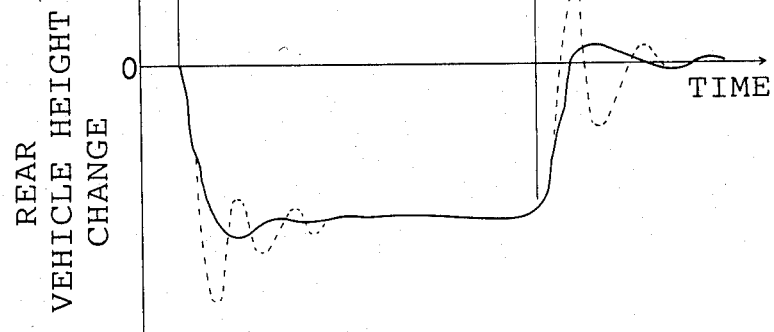

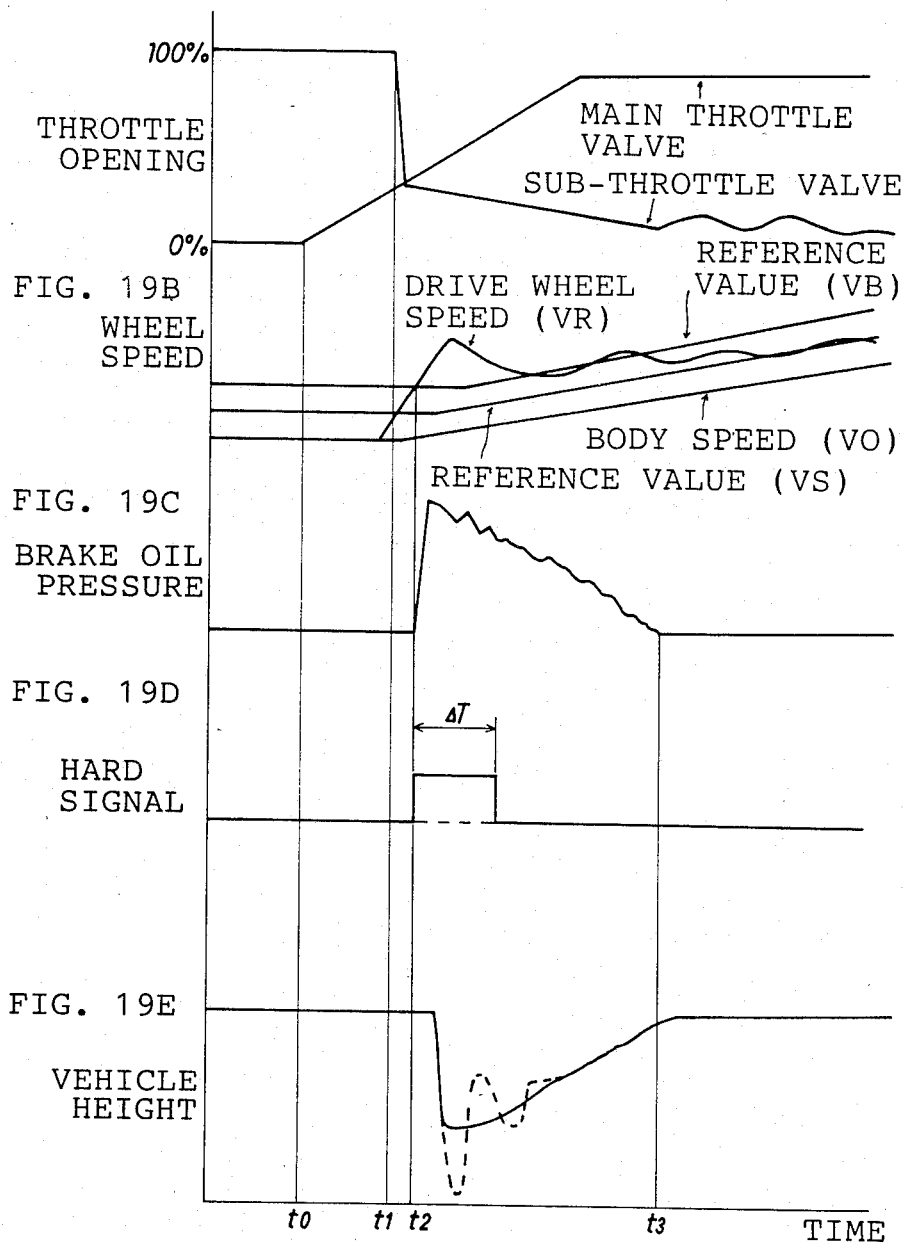

FIG. 20C

| | ENGINE REV. SPEED NE (x100rpm) | | | | | |
|---|---|---|---|---|---|---|
| $\theta_M$ (%) MAIN THROTTLE VALVE OPENING | | 0 | 4 | 8 | 12 | 16 | ... |
| | 0 | 1 | 1 | 1.2 | 1.4 | 1.6 | ... |
| | 5 | 1.4 | 1.4 | 1.3 | 1.3 | 1.4 | ... |
| | 10 | 2 | 2.1 | 2.2 | 2 | 1.8 | ... |
| | 15 | 4 | 4 | 4 | 2.8 | 3 | ... |
| | 20 | 4 | 4 | 4 | 4 | 3.5 | ... |
| | 25 | 4 | 4.5 | 5 | ... | ... | ... |
| | ⋮ | ⋮ | ⋮ | ⋮ | ⋮ | ⋮ | ⋮ |

METHOD FOR CONTROLLING A VEHICLE ATTITUDE

BACKGROUND OF THE INVENTION

This invention relates to a vehicle attitude control method for effectively preventing an abrupt change of the vehicle attitude which is likely to occur as a result of an acceleration slip control for a vehicle.

For controlling acceleration slip, i.e., slip of drive wheels when a vehicle is suddenly started or accelerated, various methods have been proposed such as an acceleration slip control utilizing a well-known oil pressure circuit for anti-skid control in Japan Patent Application No. Sho 59-199216 and another acceleration slip control in Japan Patent Application No. Sho 59-199217 in which a wheel cylinder of a drive wheel is actuated by oil pressure from the pressure source for power steering so as to control the acceleration slip.

Furthermore, as a vehicle attitude control method for preventing an abrupt change of the vehicle attitude, such an application has been proposed in Japan Patent Application No. Sho 59-27651 that the suspension characteristic is altered to preferentially keep the stability of the vehicle in response to various driving conditions, e.g., sudden starting, sudden braking, sudden turning and high-speed running.

The above-mentioned prior art, however, include some problems as will now be discussed.

When the acceleration slip control is performed by utilizing a brake installed in the vehicle, drive wheels are affected by drive force and brake force at the same time. Namely as shown in FIG. 3, a drive wheel c of a vehicle b moving in the direction of arrow a is actuated by drive force F1 which is generated by a revolution power transmitted from an engine via an axle shaft d. On the other hand, in the case of controlling acceleration slip, brake force or friction force F2 is applied to a road contact-point e of the drive wheel c by the action of a brake. As a result, the angular moment M shown in the following formula is generated around the central point of the revolution g of a suspension arm f;

$$M = F2 \times r2 - F1 \times r1 \quad (1),$$

where r1 and r2 represent the distance between the central point g and respective force vectors F1 and F2.

The above-mentioned moment M generates contraction force F3 for contracting a suspension h of the drive wheel c. As a result, in the case of rear-wheel-drive vehicle, squat is apt to occur especially when the vehicle is started, thereby riding comfort, maneuverability and stability of the vehicle are deteriorated.

Moreover, in the conventional anti-squat control, squat which occurs during controlled acceleration slip is not considered. Namely, only the starting squat which occurs when the vehicle is starting can be controlled.

Furthermore, when the vehicle height is adjusted by detecting the inclination of the vehicle by utilizing a vehicle height sensor or the like, responsiveness of the vehicle attitude control is relatively low, because the vehicle height is adjusted after a certain degree of inclination is actually detected.

SUMMARY OF THE INVENTION

Accordingly, one object of the present invention is to solve the above-mentioned problems and to provide a more improved vehicle attitude control method in which the inclination of the body due to the acceleration slip control can be quickly controlled.

Another object is to perform the vehicle attitude control on a limited basis as the occasion demands so as to provide a comfortable ride for the remainder of the time. To achieve these and other objects, this invention accomplishes the steps as shown in FIG. 1, including a step S1 of detecting a slippage of a drive wheel of the vehicle, a step S1 of determining whether or not the detected slippage is greater than a reference value, a step S2 of controlling drive force of the drive wheel when the slippage is determined to be greater than the reference value, and a step S2 of altering a suspension characteristic of the drive wheel to a harder state when the slippage is determined to be greater than the reference value.

This invention may take another form as shown in FIG. 2. Namely, if the slippage of a drive wheel is determined to be greater than a predetermined value at step P1 when the vehicle is accelerated, the drive force of the drive wheel is lowered by controlling at least brake pressure at step P2. At this time, the characteristic of a suspension which support the drive wheel is altered to a harder state at step P3, and after a predetermined time has elapsed, the suspension characteristic is restored to the original state at step P4.

The slippage of the drive wheel for the determination condition at step P1 may be calculated by dividing the difference between the peripheral speed of the drive wheel and the body speed of the vehicle by the body speed and then determining that it is greater than a predetermined value. The body speed may be calculated from the peripheral speed of a follower wheel. It may be also possible to use another determination condition that the acceleration speed which is given by differentiating the peripheral speed of the driving wheel with respect to time is greater than a predetermined value. Furthermore, for example, the determination condition at step P1 may be replaced by such a condition that the engine output is greater than the capacity of drive force transmittable to the road surface calculated from the friction coefficient between the tire and the road surface.

The drive force of the drive wheel to the road surface is lowered, for example, by applying the brake, i.e., reverse force against the revolution force of the drive wheel, or by decreasing volume of intake air or fuel injection amount of an internal combustion engine so as to lower the engine output. Braking of the drive wheel is performed by energizing or deenergizing solenoid valves installed in the hydraulic pressure circuit which connects a wheel cylinder of the drive wheel and a pressure source so as to supply pressure to the wheel cylinder.

The suspension characteristic is changed to the harder state by any of the following methods; (a) Disconnecting a passage between a main air chamber and a auxiliary air chamber of an air suspension so as to increase the spring constant; (b) Decreasing the diameter of an orifice for controlling the oil flow so as to increase the damping force of a shock absorber, or (c) Increasing the stiffness of a suspension bush or a stabilizer.

The above-mentioned vehicle attitude control can be realized by employing an electronic control unit (ECU) including a number of discrete electronic elements. It is also possible to perform the vehicle attitude control according to a predetermined control processing by utilizing an ECU which functions as a logic circuit including a wellknown CPU, a ROM, a RAM, and other peripheral circuitry chips.

The above-mentioned constitution of the present invention has the effect of swiftly controlling an abrupt change of the vehicle attitude due to the acceleration slip control.

The squat due to the acceleration slip control occurs only at the time when the brake is applied to control the drive force, therefore, the suspension characteristic which was altered to a harder state to cope with the squat is restored to the original state after a predetermined time has passed so as to keep the ride comfortable.

The above-mentioned effect is accompanied by other effects, e.g., the responsiveness of the vehicle attitude control while controlling acceleration slip is increased, and maneuverability, stability and riding comfort of a vehicle in the acceleration slip control can be kept.

BRIEF DESCRIPTION OF DRAWINGS

The invention may be best understood by reference to the following description of a preferred embodiment and the drawings in which:

FIG. 6A is a sectional view of a main part of the shock absorber;

FIG. 6B shows a cross-section taken on line VIB—VIB of FIG. 6A;

FIG. 6C shows a cross-section taken on line VIC—VIC of FIG. 6A;

FIG. 6D shows a cross-section taken on line VID—VID of FIG. 6A;

FIGS. 13A through 13F are timing charts of a vehicle attitude control of the first embodiment;

FIGS. 19A through 19E are timing charts of the second embodiment;

FIG. 20C is a table for determining an opening rate of a sub-throttle valve from a revolution speed of an internal combustion engine and an opening of a main throttle valve.

DETAILED DESCRIPTION OF PREFERRED EMBODIMENTS

Set forth below is an explanation of the first embodiment of a vehicle attitude control device based on drawings, wherein like numerals designate identical or corresponding parts throughout the several views. The vehicle attitude control device is substantially composed of a control device shown in FIG. 4 and a suspension system shown in FIG. 5.

Figure 1:
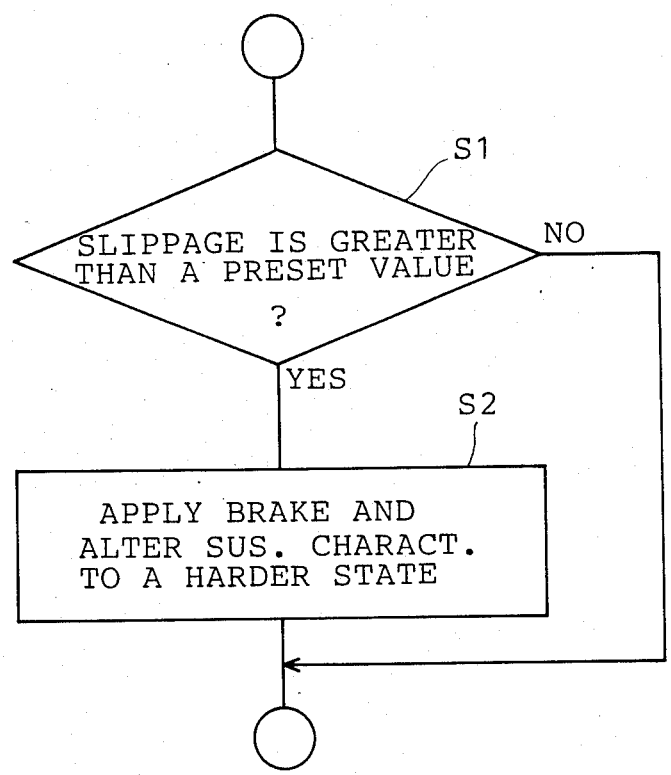
FIG. 1 is a flow chart showing a basic control processing of the first embodiment of the present invention.
Figure 2:
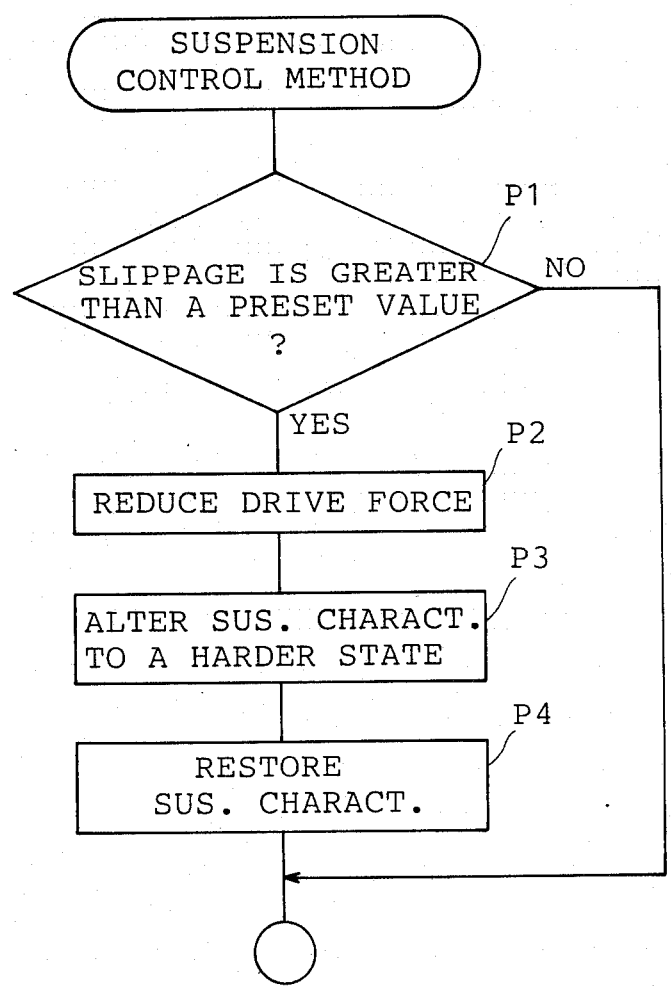
FIG. 2 is a flow chart showing a process step of second embodiment.
Figure 3:
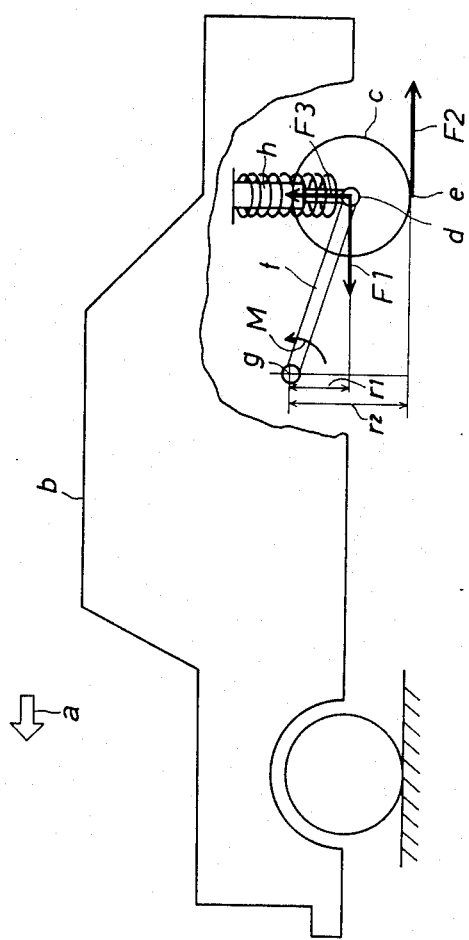
FIG. 3 illustrates an interaction of forces acting to a drive wheel in an acceleration slip control.
Figure 4:
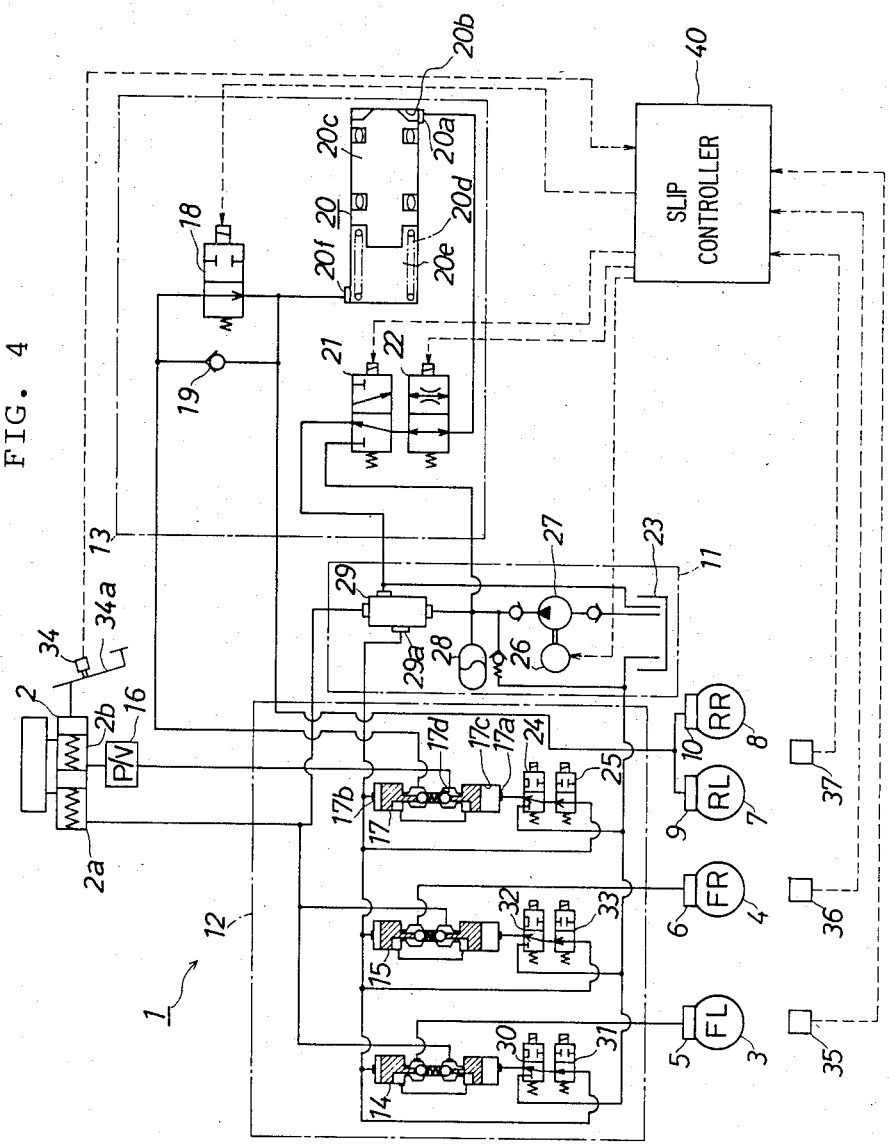
FIG. 4 is a system diagram illustrating a vehicle attitude control device of the first embodiment of the present invention.

As shown in FIG. 4, the control device 1 includes a master cylinder 2, left and right front wheels as follower wheels 3 and 4, wheel cylinders thereof 5 and 6, left and right rear wheels as drive wheels 7 and 8, wheel cylinders thereof 9 and 10, a pressure source 11, an oil pressure circuit 12 for anti-skid control, and an oil pressure circuit 13 for acceleration slip control.

Capacity control valves 14 and 15 for anti-skid control of left and right front wheels are formed in a brake oil pressure circuit which links a first chamber 2a of the master cylinder 2 and the wheel cylinders 5 and 6 of left front wheel 3 and right front wheel 4. On the other hand, a brake oil pressure circuit linking a second chamber 2b of the master cylinder 2 and wheel cylinders 9 and 10 of left and right rear wheels 7 and 8 includes a proportional valve 16, a capacity control valve 17 for anti-skid control of rear wheels, a first solenoid valve 18, a check valve 19 formed in parallel to the valve 18, and a capacity control valve 20 for an acceleration slip control.

In the case of anti-skid control, since the solenoid valve 18 is not energized and is positioned as shown in FIG. 4, the capacity control valve 17 for controlling anti-skid of rear wheels and the capacity control valve 20 for acceleration slip control are kept communicating with each other. Since a second solenoid valve 21 and a third solenoid valve 22, which are connected in series with a control input port 20a of the capacity control valve 20, are not energized and positioned as shown in FIG. 4, a pressure control chamber 20b of the capacity control valve 20 is communicated with a reservoir 23 of the pressure source 11. Thus, a piston 20c of the capacity control valve 20 is kept in a position shown in FIG. 4 by a spring 20d. At this time, the capacity control valve 17 for controlling anti-skid of rear wheels is set in three different conditions as follows by energizing and non-energizing a first selector valve 24 for rear wheels which is connected to a first control input port 17a and a second selector valve 25 for rear wheels which is connected in series with the selector valve 24.

(1) The capacity control valve 17 for anti-skid control of rear wheels is connected with an output port 29a of a regulator 29 and the control input port 17a. Oil pressure provided by a pump 27 which is driven by a motor 26 of the pressure source 11 and that provided by an accumulator 28 which accumulates working oil are converted into a required oil pressure in response to the displacement of a brake pedal by a regulator 29.

(2) The capacity control valve 17 is disconnected from each of the first control input port 17a, the regulator 29 and the reservoir 23.

(3) The capacity control valve 17 is connected with the first control input port 17a and the reservoir 23.

On the other hand, a second control input port 17b is always connected with the output port 29a of the regulator 29. The capacity control valve 17, therefore, operates as follows in response to the above-mentioned three conditions.

The pressure in a first chamber 17c including the fist control input port 17a is increased under the condition of (1), is maintained under the condition of (2), or decreased under the condition of (3). In accordance with this change of pressure in the first chamber 17c, the volume in a brake oil chamber 17d varies. As a result, the capacity control valve 17 for anti-skid control of rear wheels acts to increase, maintain or decrease the pressure in the left and right rear wheel cylinders 9 and 10 via the first solenoid valve 18 or the check valve 19 under the condition of (1), (2) or (3). By energizing or non-energizing a first and a second selector valves 30 and 31 of left front wheels and a first and a second selector valves 32 and 33 of right front wheels, the capacity control valves 14 and 15 for anti-skid control of left and right front wheels act to the left and right front wheel cylinders 5 and 6 in the same manner as the capacity control valve 17 for anti-skid control of rear wheels. The first and the second selector valves 24, 25, 30, 31, 32 and 33 are energized or deenergized by an anti-skid control device which is not shown in the drawing.

On the other hand, in the acceleration slip control, the aforementioned solenoid valve 18 is energized and is shifted to the state shown in the right hand part of the solenoid symbol 18, and the capacity control valve 17 for anti-skid control of rear wheel is disconnected from the capacity control valve 20 for acceleration slip control by the first solenoid valve 18 and the check valve 19. At this time, the state of the capacity control valve 20 for acceleration slip control varies in the following four conditions by energizing or non-energizing the second and the third solenoid valves 21 and 22 which are connected to the control input port 20a of the capacity control valve 20.

(i) the control input port 20a is connected with the accumulator 28.

(ii) the control input port 20a is connected with the accumulator 28 via a throttle valve.

(iii) the control input port 20a is connected with the reservoir 23 via a throttle valve.

(iv) the control input port 20a is connected with the reservoir 23.

In response to the above-mentioned four conditions, the capacity control valve 20 for acceleration slip control performs as follows.

The pressure in the control oil chamber 20b including the control input port 20a is increased under the condition (i), slowly increased under the condition (ii), slowly decreased under the condition (iii), or decreased under the condition (iv). As a result, the volume in the control oil chamber 20b changes and the piston 20c is shifted to the left and to the right as shown in FIG. 4 against a force of a spring 20d. Thus, oil pressure is supplied from an output port 20f of a brake oil pressure chamber to the left and right rear wheel cylinders 9 and 10, thereby pressure in the wheel cylinders 9 and 10 is increased, slowly increased, slowly decreased or decreased in response to the above-mentioned conditions.

The control device 1 shown in FIG. 4 includes a pedal switch 34 for outputting ON/OFF signals in response to the operation of a brake pedal 34a, a revolution speed sensor 35 for left front wheel 3, a revolution speed sensor 36 for right front wheel 4, and a revolution speed sensor 37 for left and fight rear wheels. Signals detected by each of the above-mentioned sensors are inputted into an acceleration slip control device 40. The acceleration slip control device 40 controls the above-mentioned first, second and third solenoid valves 18, 21 and 22 and the motor 26 for driving the pump.

Figure 5:
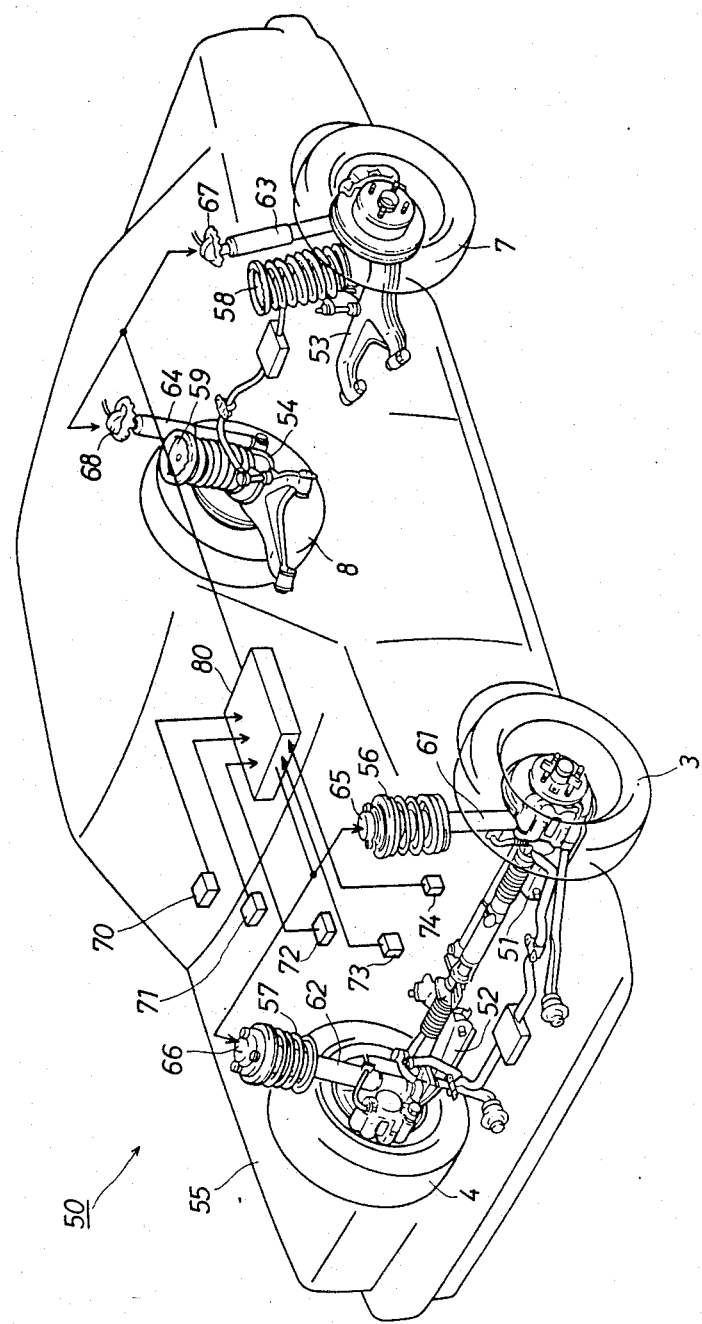
FIG. 5 illustrates a construction of a suspension controller installed in the control device utilizing the present invention.

Next, the systematic construction of a suspension system is explained in accordance with FIG. 5. The suspension system 50 is substantially composed of coil springs 56, 57, 58 and 59 and shock absorbers 61, 62, 63 and 64 which are respectively installed between a vehicle body 55 and suspension arms 51, 52, 53 and 54 of the left front wheel 3, the right front wheel 4, the left rear wheel 7 and the right rear wheel 8.

Damping force alteration actuators 65, 66, 67 and 68 are respectively mounted on the top of the shock absorbers 61, 62, 63 and 64.

The suspension system 50 further includes a vehicle speed sensor 70 for processing a vehicle speed signal, a stop lamp switch 71 for detecting a brake signal, a steering sensor 72 for detecting steering direction, a throttle position sensor 73 for detecting a throttle opening which is proportional to the displacement of the acceleration pedal, and a neutral start switch 74 for detecting the shift position of the automatic transmission. The detected signals of the above-mentioned sensors and switches are inputted into a shock absorber control device 80 which controls the damping force alteration actuators 65, 66, 67 and 68.

Since the shock absorbers 61, 62, 63 and 64 have the same construction, only the left rear wheel shock absorber 63 is explained as an example. FIG. 6A is a sectional view of a main part of the shock absorber. FIG. 6B shows a crosssection taken on line VIB—VIB of FIG. 6A. FIG. 6C shows a cross-section taken on line VIC—VIC of FIG. 6A. FIG. 6D shows a cross-section taken on line VID—VID of FIG. 6A.

As shown in FIG. 6A, the shock absorber 63 includes a hollow piston rod 83 within an outer cylinder 82 and a piston 84 which is slidably fitted in the outer cylinder 82. A control rod 85 is inserted into the piston rod 83, and is held by a guide member 85a which is fixed to the piston rod 83. The control rod 85 is equipped with a rotary valve 86 which includes three orifices 87a, 87b and 87c. On the other hand, the piston rod 83 also includes three orifices 88a, 88b and 88c. Each of these orifices is positioned to be interactive with each other as shown in FIGS. 6B, 6C and 6D. The control rod 85 is rotated by the damping force alteration actuator 67 so as to drive the rotary valve 86. Thus, the damping force can be altered to a high state (HARD), a low state (SOFT) or an intermediate state (SPORT) by communicating or discommunicating the orifices 87a and 88a, 87b and 88b, and 87c and 88c, respectively. Plate valves 89a and 89b, which are fixed to the piston 84, function to communicate or discommunicate passages 90a and 90b.

Figure 7C:
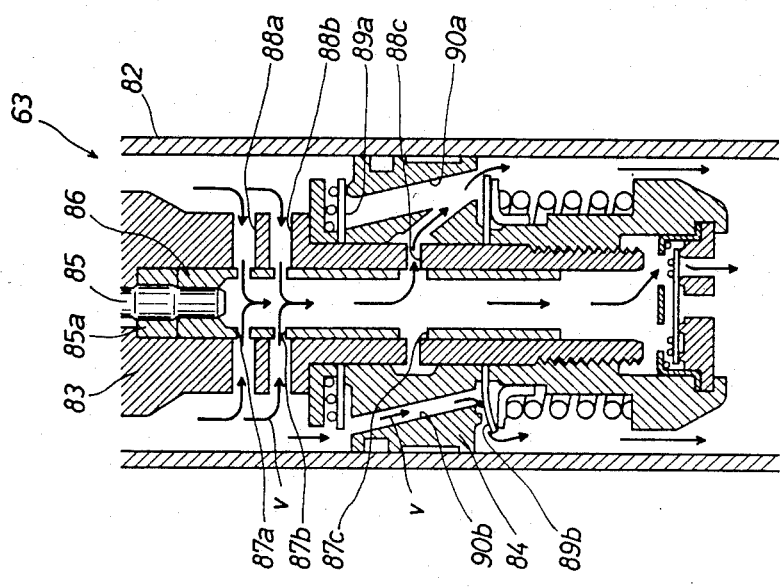
FIG. 7C is a sectional view of the shock absorber in the expanding condition.
Figure 7B:
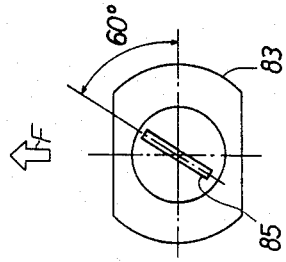
FIG. 7B shows the angular relation between the control rod and the piston rod in the condition shown in FIG. 7A.
Figure 7A:
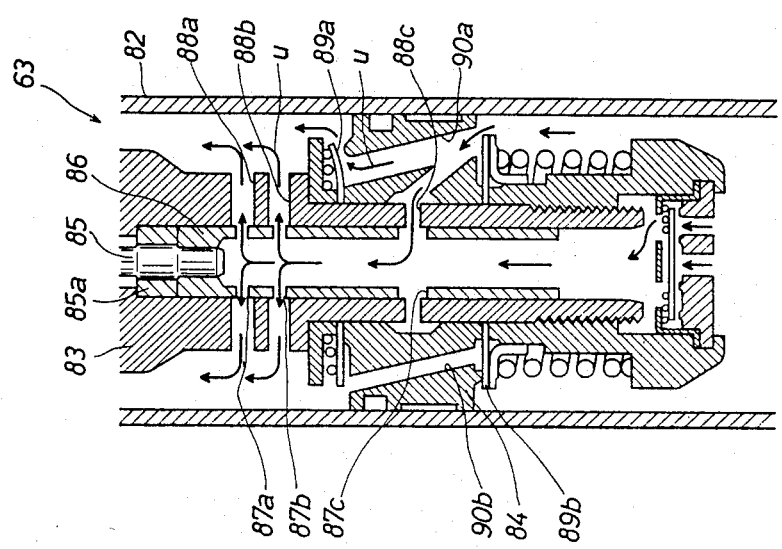
FIG. 7A is a sectional view of the shock absorber in the contracting condition when the orifices are opened.

When the piston rod 83 and the control rod 85 are positioned as shown in FIG. 7B, that is, when the control rod 85 is positioned at 60° away from the normal line to the front direction shown by an arrow F, all of the above-mentioned orifices 87a and 88a, 87b and 88b, 87c and 88c are connected with each other. In the contracting side as shown in FIG. 7A, the plate valve 89a is opened so as to channel the passage 90a. Thus, the oil flows in the direction shown by an arrow u in FIG. 7A through the orifices 87a, 87b, 87c, 88a, 88b and 88c and the passage 90a. On the other hand, in the expanding side as shown in FIG. 7C, the plate valve 89b is opened so as to channel the passage 90b. Thus, the oil flows in the direction shown by an arrow v in FIG. 7C through the orifices 87a, 87b, 87c, 88a, 88b, 88c and the passage 90b. In this case, since the throttle resistance of the oil flow is small, the damping force of the shock absorber 63 is set to the low (SOFT) state.

Figure 8C:
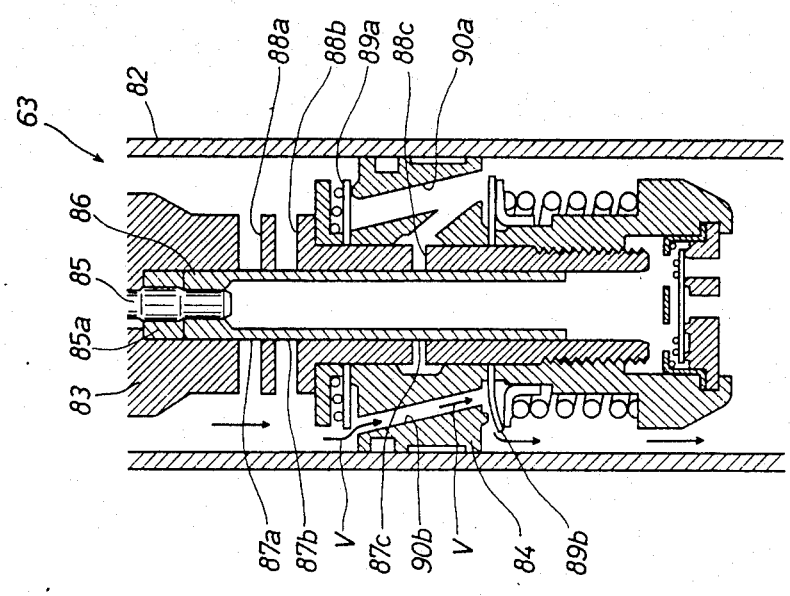
FIG. 8C is the sectional view of the shock absorber in the expanding condition.
Figure 8B:
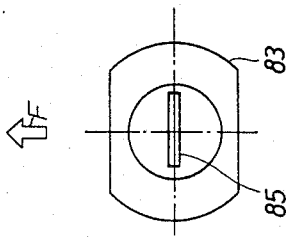
FIG. 8B illustrates the angular relation between the control rod and the piston rod in the condition shown in FIG. 8A.
Figure 8A:
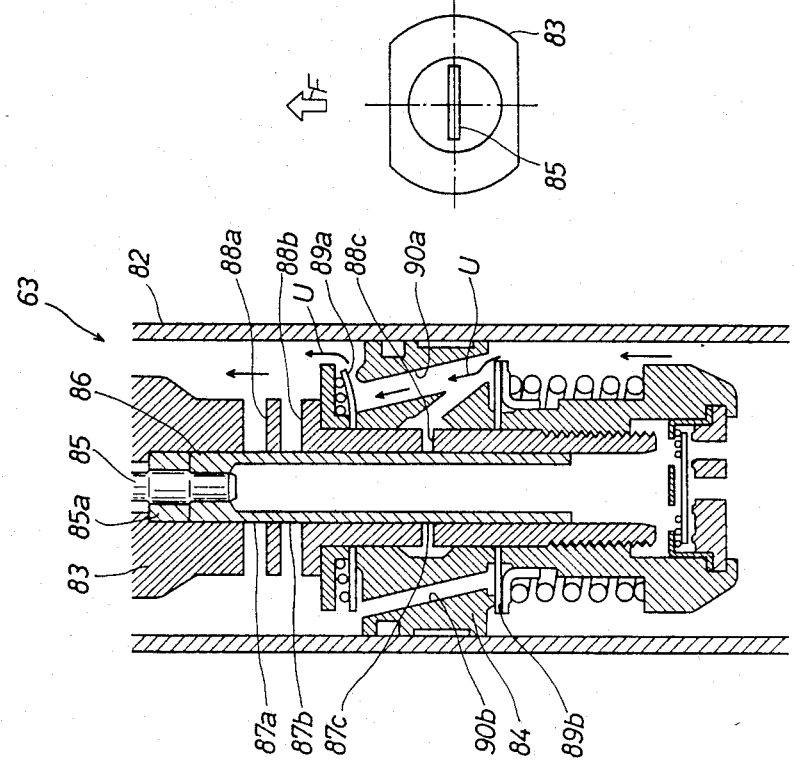
FIG. 8A is a sectional view of the shock absorber in the contracting condition when the orifices are closed.

When the piston rod 83 and the control rod 85 are positioned as shown in FIG. 8B, namely, the control rod 85 is positioned perpendicular to the front direction shown by an arrow F, all of the above-mentioned orifices 87a and 88a, 87b and 88b, and 87c and 88c are shut. On the contracting side, therefore, the oil flows only through the passage 90a in the direction shown by an arrow U in FIG. 8, and on the expanding side, the oil flows only through the passage 90b in the direction shown by an arrow V in FIG. 8C. In this case, since the throttle resistance of the oil flow is high, the damping force of the shock absorber 63 is set to the high (HARD) state.

Figure 9:
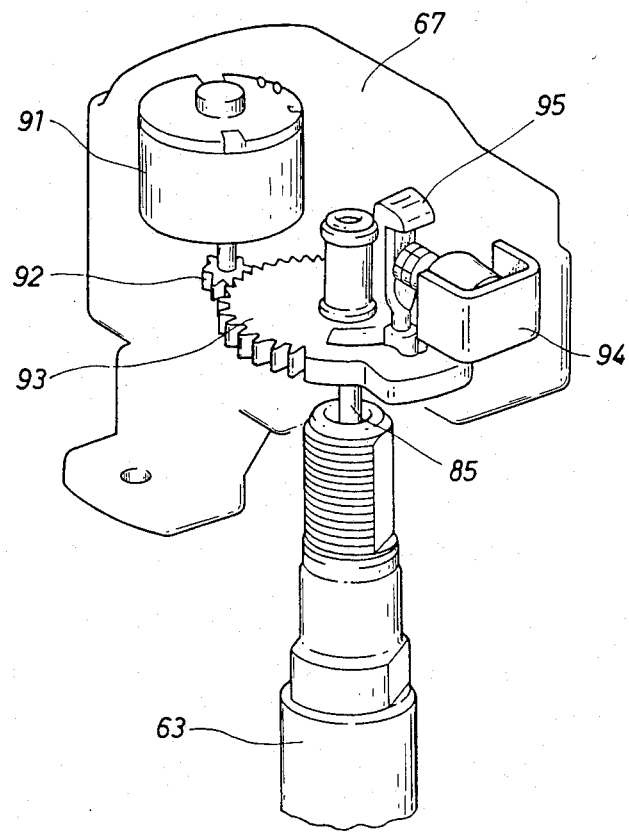
FIG. 9 is a perspective view of a damping force alteration actuator.

Because all of the damping force alteration actuators 65, 66, 67 and 68 have the same construction, only the actuator 67 for the left rear wheel is detailed as an example based on FIG. 9. The damping force alteration actuator 67 is equipped with a direct current (DC) motor 91, a pinion gear 92 attached to the DC motor 91, and a sector gear 93 engaged with the piston gear 92. The control rod 85 is mounted at the center of the sector gear 93. If the DC motor 91 is rotated in normal and reverse directions, being controlled by the shock absorber controller 80, the control rod 85 also rotates in normal and reverse directions so as to communicate or shut off the orifices 87a and 88a, 87b and 88b, 87c and 88c, and thus to alter the damping force of the shock absorber 63 to three states, i.e., 'SOFT', 'SPORT' and 'HARD'. A stopper 95, which is driven by a solenoid 94, functions to fix the position of the control rod 85 when the damping force is set to the high (HARD) state.

Figure 10:
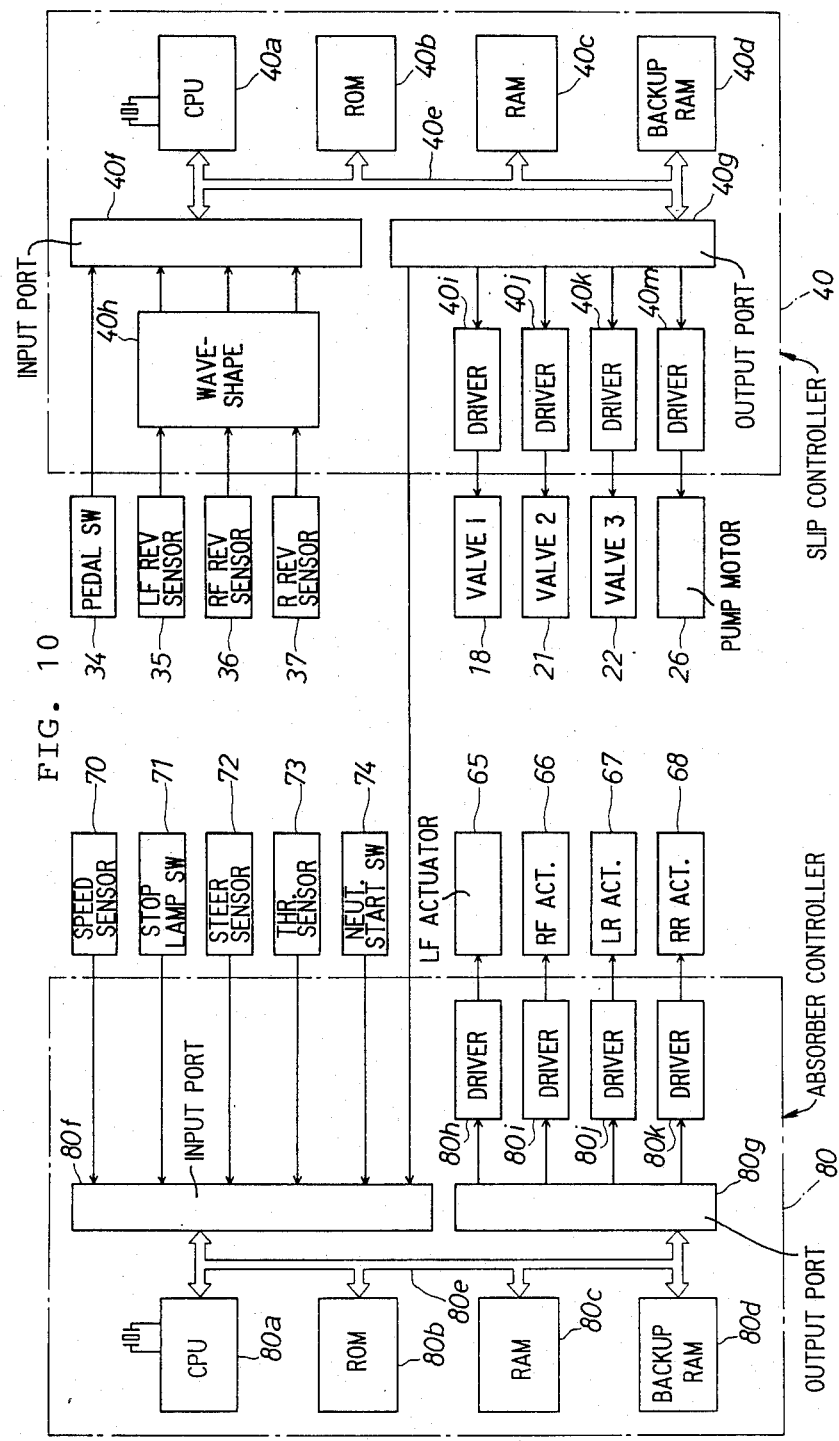
FIG. 10 is a block diagram showing a construction of an acceleration slip control circuit and a shock absorber control circuit.

Set forth below is an explanation for the construction of the acceleration slip control device 40 and the shock absorber controller 80 in reference with FIG. 10.

The acceleration slip control device 40 is constructed as a logic circuit having a CPU 40a, a ROM 40b, a RAM 40c and a back-up RAM 40d. Each of them is connected to an input port 40f and an output port 40g via a common bus 40e so as to transmit data with outside devices. The signals detected by the pedal switch 34 is directly inputted into the input port 40f. On the other hand, the signals detected by each of the revolution speed sensors for the left front wheel, the right front wheel and the rear wheels pass through a wave-shaping circuit 40h, and then inputted into the input port 40f.

Moreover, the acceleration slip control device 40 includes driving circuits 40i, 40j, 40k and 40m for the first, the second, the third solenoid valves 18, 21 and 22 and for a motor 26. The CPU 40a outputs signals via the output port 40g to each of the above-mentioned driving circuits 40i, 40j, 40k and 40m, and also to the shock absorber controller 80.

The shock absorber controller 80 is constructed as a logic circuit, having a CPU 80a, a ROM 80b, a RAM 80c and a back-up RAM 80d. They are connected to an input port 80f and an output port 80g via a common bus 80e so as to transmit data with outside devices.

Signals detected from the vehicle speed sensor 70, the stop-lamp switch 71, the steering sensor 72, the throttle position sensor 73 and the neutral start switch sensor 74 and signals outputted from the acceleration slip control device are inputted into the input port 80f.

Furthermore, the shock absorber controller 80 includes drive circuits 80h, 80i, 80j and 80k for the damping force alteration actuators 65, 66, 67 and 68. The CPU 80a outputs control signals to each of the above-mentioned drive circuits via the output port 80g.

Figure 11:
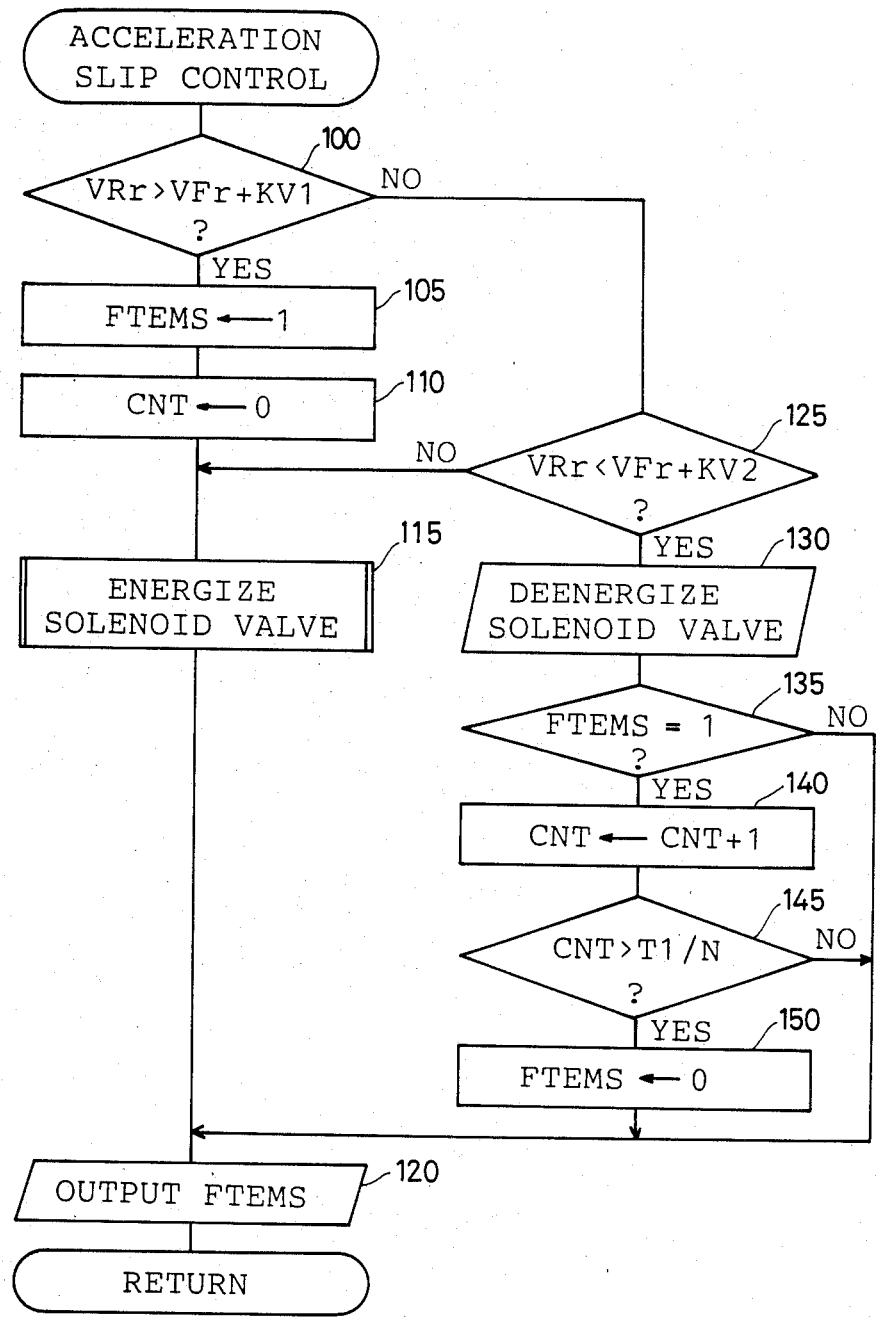
FIG. 11 is a flow chart for explaining process steps of the acceleration slip control.

FIG. 11 is a flow chart showing the control process of the acceleration slip control device 40. Prior to the execution of this routine, a peripheral speed calculation process (not shown) has been executed for calculating a front wheel peripheral speed VFr as a follower-wheel peripheral speed and a rear wheel peripheral speed VRr as a drive-wheel peripheral speed by utilizing the detected signals of revolution speed sensors 35, 36 and 37 for left front wheel, right front wheel and rear wheels. The calculated data of wheel peripheral speeds are stored in a predetermined area in the RAM 40c and are updated at all times. This process steps are repeated every predetermined time interval.

At step 100, it is determined if the rear wheel peripheral speed VRr is greater than a reference value for determining the occurrence of the acceleration slip. The reference value is a sum of the front wheel peripheral speed VFr and a constant KV1 which is determined from a characteristic of tires. The occurrence of the acceleration slip may be determined, for example, in accordance with the following formula:

$$VRr > VFr/(1-S) \tag{1}$$

wherein 'S' represents a slippage of a tire.

It is also possible to determine the above-mentioned reference value by multiplying a front wheel peripheral speed by a predetermined constant.

If the rear wheel peripheral speed VRr is greater than the reference value at step 100, it is determined that the acceleration slip occurs, and the process step proceeds to step 105. At step 105, the damping force alteration flag FTEMS is set to 1, and the process step proceeds to step 110 where a delay time counter CNT is reset to 0. At the following step 115, the aforementioned solenoid valves 18, 21 and 22 are driven so as to control the acceleration slip by applying brake to the left and right rear wheels 7 and 8. This process is well known in the conventional acceleration slip control. Namely, the capacity control valve 20 for an acceleration slip control is actuated by energizing and deenergizing the first, the second and the third solenoid valves 18, 21 and 22, and then the pressure in the left rear wheel cylinder 9 and the right rear wheel cylinder 10 is increased or decreased, thereby restricting the overrevolution of the left and right rear wheels 7 and 8. At step 120, the value of the damping force alteration flag FTEMS is outputted to the shock absorber controller 80, and then the present process is once concluded.

On the other hand, when the rear wheel peripheral speed VRr is lower than the reference value at step 100, it is determined that the acceleration slip does not occur or that the acceleration slip during braking is inconsequential, and the process step proceeds to step 125. At step 125, the rear wheel peripheral speed VRr is compared with a reference value for determining the conclusion of the acceleration slip. The reference value is a sum of the front wheel peripheral speed VFr and a constant KV2. If the value VRr is not lower than the reference value, it is determined that the acceleration slip has not been sufficiently restrained yet, and then the process step proceeds to step 115. This control process is repeated until the value VRr becomes lower than the reference value.

On the other hand, if the rear wheel peripheral speed VRr is lower than the above-mentioned conclusion reference value, the process step proceeds to step 130. At this step, it is determined that the acceleration slip is restrained. Then the solenoid valves 18, 21 and 22 are deenergized, and are put back to its normal position by the return spring as shown in FIG. 4. At the next step 135, it is determined if the damping force alteration flag FTEMS is set. If the answer is 'YES', the process step proceeds to step 140. If 'NO', it proceeds to step 120 and this control process is once concluded. The process at step 140 is executed when the damping force is altered so as to control the acceleration slip. At this step, the delay time counter CNT is incremented by 1. At step 145, it is determined whether or not the value of the delay time counter CNT is greater than a delay time reference value which is obtained by dividing a delay time T1 by an execution time N for the present acceleration slip control. If the result is 'NO' at step 145, namely, the value of the delay time counter CNT is not greater than the delay time reference value, it is determined that the time period T1 has not elapsed yet, and then the present control process is once concluded via step 120. On the other hand, if the result is 'YES' at step 145, it is determined that the delay time T1 has elapsed, and the process step proceeds to step 150 where the damping force alteration flag FTEMS is reset to 0. Then, the present control process routine is concluded via step 120. Hereafter, this control routine is repeated every predetermined time interval (e.g., every 4 msec).

Figure 12:
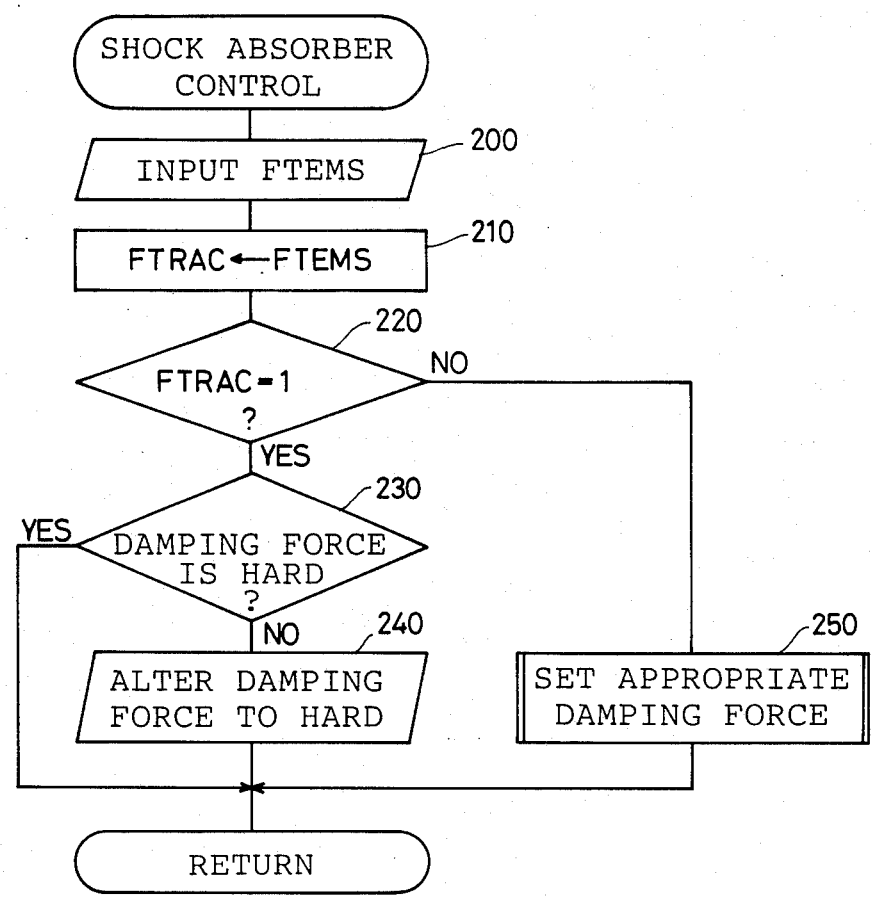
FIG. 12 is a flow chart for explaining process steps of the shock absorber control.

FIG. 12 is a flow chart showing the shock absorber control process executed by the shock absorber controller 80. This control process is carried out every predetermined time interval by interrupting a vehicle attitude control process for altering the damping force (not shown) so as to control an abrupt change of the vehicle body caused by sudden starting, sudden braking, sudden turning and high speed driving.

At step 200, the value of the damping force alteration flag FTEMS outputted from the acceleration slip control device 40 is inputted into the CPU 80a. At step 210, the value of the acceleration slip flag FTRAC is made equivalent to the value of the damping force alteration flag FTEMS. At the following step 220, it is determined if the acceleration slip flag FTRAC is set. If it is set, the process step proceeds to step 230. At this step, it is determined whether or not the damping force of the rear shock absorbers 63 and 64 has been set to the high (HARD) state. If the answer is 'YES', this control process is once concluded, while if 'NO', the program proceeds to step 240. At step 240, the damping force of the rear shock absorbers 63 and 64 is set to the high (HARD) state so as to prevent the squat which would occur while controlling acceleration slip. Namely, drive current is supplied to the damping force alteration actuators 67 and 68, and the orifices 87a, 87b and 87c, and each corresponding orifices 88a, 88b and 88c are closed by the rotation of the control rod 85. After this, the present control process routine is concluded. On the other hand, at step 220, if it is determined that the acceleration slip flag FTRAC is reset, the program proceeds to step 250. At this step, there is no need to alter the damping force to cope with the acceleration slip, therefore, the damping force of the shock absorbers 61, 62, 63 and 64 is set to predetermined values in the vehicle attitude control process. Namely, when the vehicle body is inclined due to the change of the driving condition, the damping force of the shock absorbers in the contracting side is set to the high (HARD) state as well known in a conventional control process. Then, the present control process is once concluded. Hereafter, the routine is repeatedly executed every predetermined time interval by interrupting into the vehicle attitude control process.

An example of execution of the above-mentioned control is set forth below with reference to FIGS. 13A to 13F.

At a time point t10, the rear wheel peripheral speed VRr becomes greater than the reference value for determining the occurrence of the acceleration slip in FIG. 13A. At the same time t10, therefore, the values of the damping force alteration flag FTEMS and the acceleration slip flag FTRAC are set to 1 at steps 105 and 210, respectively as shown in FIGS. 13B and 13C. Then, the acceleration slip control is started at step 115. Moreover, at the same time t10, drive current is supplied to the damping force alteration actuators 67 and 68 of the left and the right rear wheels 7 and 8 as shown in FIG. 13D. At a time point t11 after an actuator operation time period Ta has elapsed, the damping force of the shock absorbers 63 and 64 is altered from the low (SOFT) state to the high (HARD) state at step 240 as shown in FIG. 13E. In the above-mentioned acceleration slip control, when the damping force is set to the low (SOFT) state, the rear vehicle height largely changes as shown by a dotted line in FIG. 13F. The change, however, can be subsided as shown by a solid line by altering the damping force from 'SOFT' state to 'HARD' state.

On the other hand, by controlling the acceleration slip, the rear wheel peripheral speed VRr becomes lower than the reference value for determining the settlement of the acceleration slip at a time point t12 as in FIG. 13A. Thus, the solenoid valves 18, 21 and 22 are deenergized at steps 100, 125 and 130, respectively. At the same time t12, the delay time counter CNT is started at steps 135 and 140. At a time point t13, when a delay time period T1 has passed since the time point t12, both of the damping force alteration flag FTEMS and the acceleration slip flag FTRAC are reset to 0 at steps 150 and 210, respectively as in FIGS. 13 B and C. Furthermore, at the time point t13, drive current is supplied to the damping force alteration actuators 67 and 68 for left and right rear wheels 7 and 8 as in FIG. 13D. At a time point t14 after the actuator operation time period Ta has elapsed since the time point t13, the damping force of the shock absorbers 63 and 64 of left and right rear wheels 7 and 8 is altered from the high (HARD) state to the low (SOFT) state at step 250 as in FIG. 13E. If the damping force is immediately altered to the low (SOFT) state at the time point t12 when the above-mentioned acceleration control is concluded, the rear vehicle height again shows large change as shown by a dotted line in the graph. Actually, however, the damping force is kept in the high (HARD) state until the time point t13 after the delay time T1 has elapsed, the change of the rear vehicle height can be subsided as shown by a solid line in FIG. 13F. After this, in the process of the acceleration slip control, the damping force of the shock absorbers 63 and 64 of left and right rear wheels is altered to the high (HARD) state, and any large change in the rear vehicle height is controllably subsided.

As explained in the above, in the present embodiment, the damping force of the rear wheel shock absorbers 63 and 64 is altered to 'HARD' state in accordance with the acceleration slip control, and after the delay time period T1 has elapsed since the acceleration slip control is concluded, the damping force of the shock absorbers 63 and 64 is set to an appropriate state in response to the current driving condition. As a result, squat, a sudden sinking of the rear part of the body can be immediately restrained because the damping force of the shock absorbers 63 and 64 of left and right rear wheels has been set to 'HARD' state even while braking force is applied to the rear wheels for controlling the acceleration slip.

As another aspect of this embodiment, squat during during initial movement of the vehicle can be prevented because swift alteration of the damping force can produce high responsiveness in the vehicle attitude control.

In addition, the acceleration slip can be settled while keeping maneuverability, stability and riding comfort of the vehicle, since the vehicle attitude is stabilized.

Furthermore, any aftermath which occurs when the brake force acting to the rear wheels 7 and 8 is stopped, can be prevented. That is because the damping force of the shock absorbers 63 and 64 of the left and the right rear wheels 7 and 8 has been kept in the high 'HARD' state for a delay time period T1 after the acceleration slip control is concluded.

In response to the termination of the acceleration control, the altered damping force of the shock absorbers 63 and 64 is set to an appropriate state according to the driving condition, e.g., acceleration, braking, turning and so on. This results in the retention of maneuverability, stability and riding comfort of the vehicle.

Although this embodiment is applied to a rear-wheel-drive vehicle, it is available to a front-wheel-drive vehicle, and it can produce the same effects as mentioned in the above.

Moreover, the present invention can be applied to a vehicle which includes an air suspension system, a stiffness-variable suspension bush or a stiffness-variable stabilizer. In this case, spring constant of air suspensions or stiffness of a suspension bush or a stabilizer is changed instead of altering damping force so as to alter the suspension characteristic to a harder state.

For example, it is possible to alter the suspension characteristic to various states by combining multiple conditions such as spring constant of suspensions, damping force of shock absorbers, stiffness of suspension bush and stabilizer. In such a case, it is preferable to alter the suspension characteristic to a corresponding appropriate hard state in response to the strength of the brake force and the drive force which are applied in the acceleration slip control.

Figure 14:
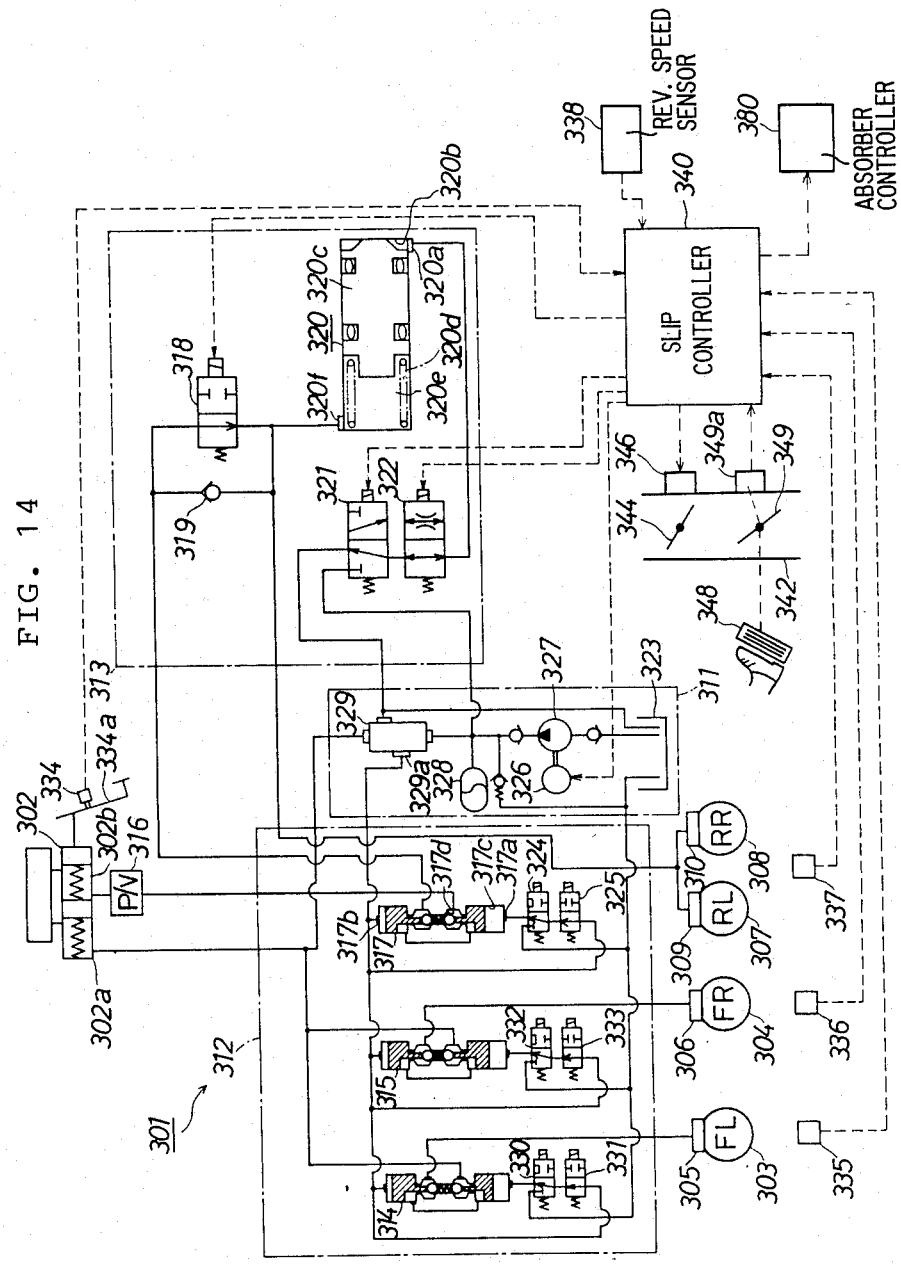
FIG. 14 is a system diagram of an acceleration slip control device of the second embodiment utilizing the present invention.

Set forth below is an explanation of the second embodiment of the present invention. FIG. 14 is a system diagram of an acceleration slip control device of the second embodiment. It is similar to FIG. 4 in the first embodiment, with the exception of the device for adjusting the engine output. The following explanation mainly refers to this differece. The similar components in FIG. 14 are designated with the same last two digit of those in FIG. 4.

Figure 20A:
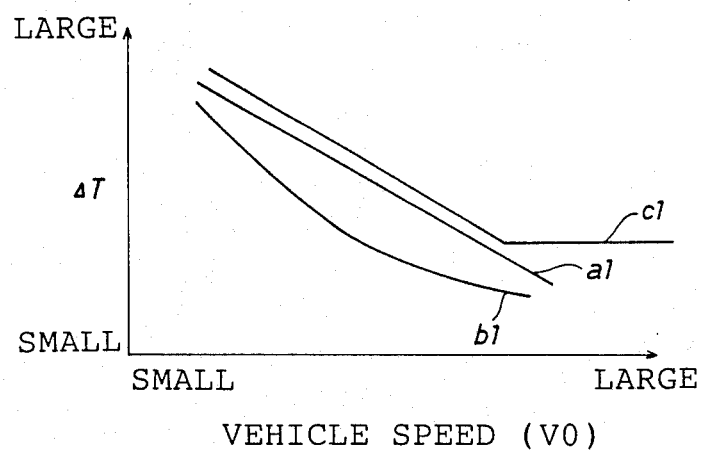
FIG. 20A illustrates a relation between a vehicle speed and a time period for which a suspension characteristic is set to 'HARD'.
Figure 20B:
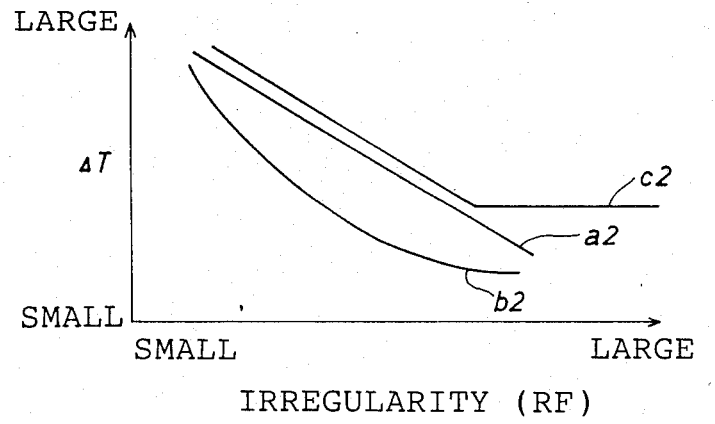
FIG. 20B illustrates a relation between irregularity degree of a road surface and a time period for which a suspension characteristic is set to 'HARD'.
Figure 20D:
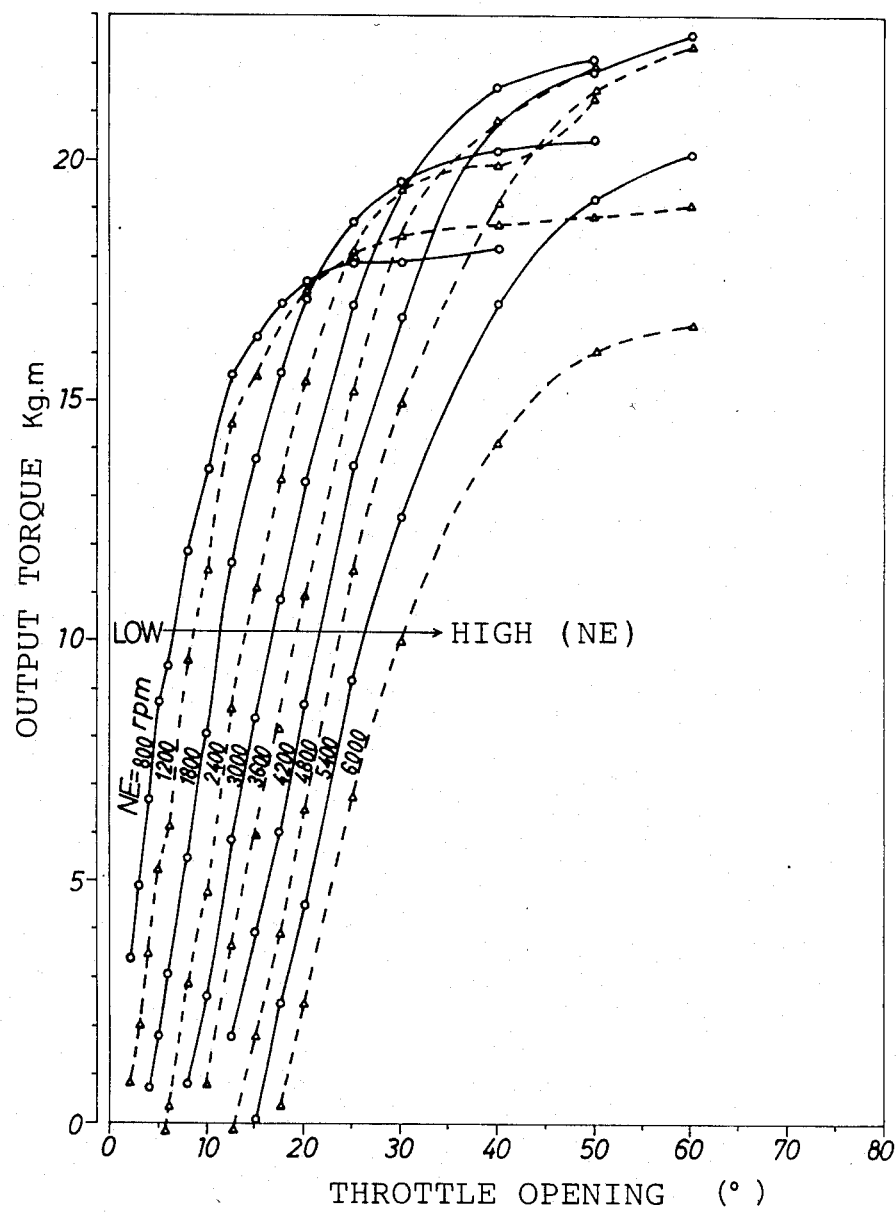
FIG. 20D is a graph showing a relation between a throttle valve opening and an output torque.

In the second embodiment, the acceleration slip control is executed by an acceleration slip control device 301 by adjusting intake air amount of an internal combustion engine, taking preference over the control of brake force. In the second embodiment, a sub-throttle valve 344 is installed within a suction pipe 342 of the internal combustion engine in addition to a main throttle valve 349 which is connected with an accelerator pedal 48. The opening of the subthrottle valve 344 is controlled by a motor 346. Thus, an excessive slip can be controlled even through the main throttle valve 349 is suddenly opened. A throttle position sensor 349a includes an idle switch which outputs "ON" signal when the throttle valve 349 is completely shut off. The sensor 349a outputs a signal to an acceleration slip control circuit 340 in response to the opening of the throttle valve 349 for executing an operation based on a map in FIG. 20. Detail explanation of this operation is given later.

Figure 15:
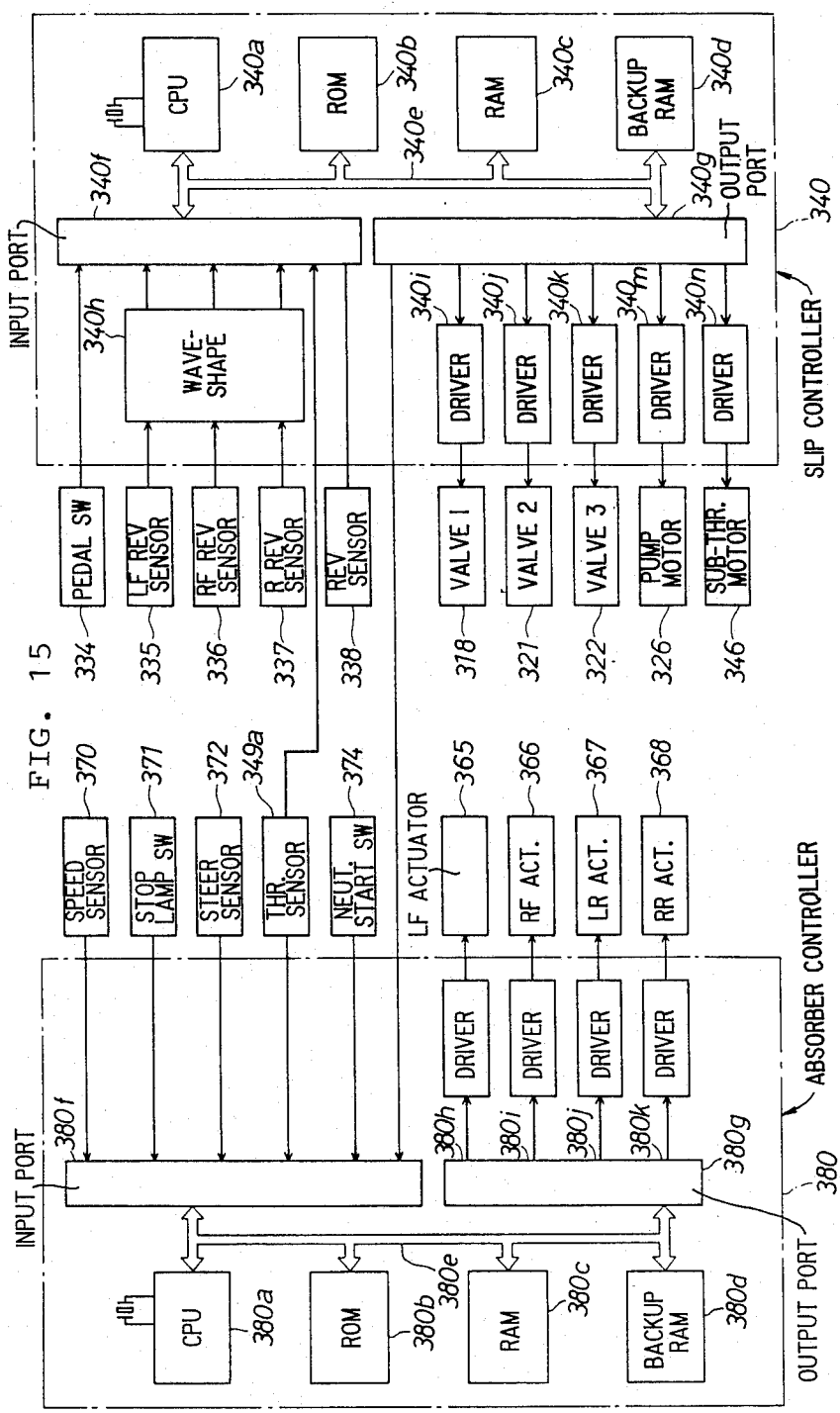
FIG. 15 is a block diagram showing the acceleration slip control circuit and the shock absorber control circuit of the second embodiment.

FIG. 15 is a block diagram showing an acceleration slip control circuit 340 and a shock absorber control circuit 380 in the second embodiment. It is also similar to FIG. 10 in the first embodiment, while a revolution speed sensor 338 and a motor 346 for driving a sub-throttle valve are employed in the second embodiment. In this figure, the similar those in FIG. 10.

Figure 16:
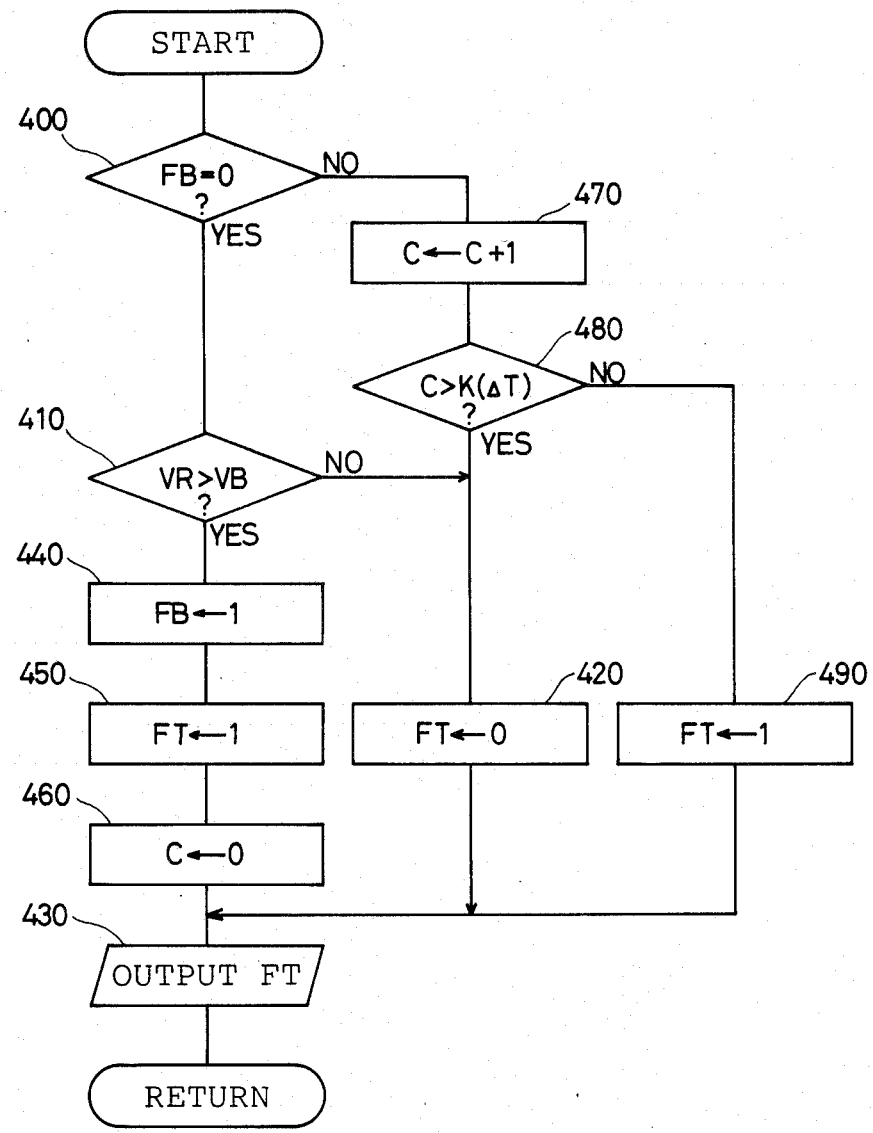
FIG. 16 is a flow chart showing process steps for a suspension control executed in a control circuit of a shock absorber in the second embodiment.

Next, the suspension control steps executed by the shock absorber control circuit 380 are explained based on the flow chart in FIG. 16.

Preceding the execution of this suspension control, a peripheral speed VF of a front wheel, i.e., a follower wheel and a peripheral speed VR of a rear wheel, i.e., a drive-wheel, are calculated based on signals outputted from revolution speed sensors for left and right front wheels 335 and 336 and for rear wheels 337. The peripheral speeds VF and VR are stored in a predetermined area in a RAM 380c, and they are always innovated. The present suspension control is repeatedly executed every predetermined time interval.

In case the slippage of an acceleration slip is not so high as to start a brake oil pressure control, the control process proceeds as follows.

At step 400, it is determined whether or not a flag FB is reset. If the flag FB is reset to 0, it indicates that the brake control is not performed. At step 410, the rear wheel peripheral speed VR is compared with a reference value VB which is larger than the front wheel peripheral speed VF by a preset value. If the value VR is not greater than the value VB, the flag FT is reset at step 420. The flag FT is for determining whether or not the suspension characteristic should be altered to 'HARD' state. When the flag FT is reset at step 420, the suspension characteristic is kept in 'SOFT' state at step 430.

On the other hand, if the slippage of the acceleration slip is relatively high, then brake oil pressure control is required with the control program proceeding as follows.

When the value VR is determined to be greater than the reference value VB at step 410, the process step proceeds to step 440 where the flag FB is set to 1. Then at step 450, the flag FT is set to 1, and the program proceeds to step 460 where a counter C is reset. The counter C is for determining the time interval for which the suspension characteristic is kept in the 'HARD' state, namely, the flag FT is kept at 1. Since the flag FT has been set to 1, the shock absorber control circuit 80 acts to alter the suspension characteristic to the 'HARD' state.

After that, the program is restarted from step 400. In this case, the flag FB is set to 1, and the program proceeds to step 470. At this step, the value of the counter C is incremented by 1. At step 480, the value of the counter C is compared with a count value k which corresponds to a time interval $\Delta T$ for which the suspension characteristic is kept in 'HARD' state. If the value C is not greater than the value k ($\Delta T$), the process step proceeds to step 490, where the flag FT is set to 1. Thus, the suspension characteristic is determined to be kept in the 'HARD' state at step 430. The present control process is repeated until the value of the counter C becomes greater than the value k ($\Delta T$). If the value of the counter C becomes greater than the value k at step 480, the flag FT is reset at step 420, thereby the suspension characteristic is restored to the 'SOFT' state at step 430. Since the brake torque needed for braking a drive wheel decreases as the vehicle speed increases, the relationship between the value k ($\Delta T$) and the vehicle speed VO may be set to be a straight line a1 or a curved line b1 in FIG. 20A. Moreover, it may be set to be a deflected line c2, namely, the value $\Delta T$ may be set to a certain value when the vehicle speed VO becomes greater than a predetermined value. Furthermore, the value $\Delta T$ can be determined in accordance with the degree of irregularity RF in the road surface, since the riding comfort is improved by altering suspension characteristic from 'HARD' to 'SOFT' as quickly as possible in response to the road condition. In this case, the relation between the value $\Delta T$ and the value RF may be also shown by a straight line a2, a curved line b2 or a deflected line c2 in FIG. 20B as same as in FIG. 20A.

For a more complete understanding of the above-mentioned control, the mechanism of the control of the second embodiment as a whole is explained with reference to the timing charts shown in FIGS. 19A–19E.

When a driver suddenly steps on the accelerator pedal 48, the main throttle valve 49 is suddenly opened at a time point t0 in FIG. 19A, and the peripheral speed VR of the drive wheels 7 and 8 is sharply increased. As a result, the difference between the peripheral speed VR of the drive wheels and the vehicle body speed VO become large. If the peripheral speed VR becomes greater than a reference value VS, a target value for a sub-throttle control, and moreover, surpasses a reference value VB for a brake control, the brake control is started so as to increase the brake oil pressure for braking the drive wheels 7 and 8 as shown in FIG. 19C. At the same time, as shown in FIG. 19D, the suspension characteristic is altered to 'HARD'. Thus, the vehicle height is changed as shown in FIG. 19E. If the suspension characteristic is not changed to 'HARD' state as in the conventional control, a considerable vehicle height change as shown in FIG. 19E occurs being accompanied with a vehicle height vibration. As shown in FIG. 19D, the suspension characteristic is restored to 'SOFT' state after a predetermined time period $\Delta T$ has elapsed. Namely, the suspension characteristic is set to 'HARD' when the brake oil pressure begins to increase (at this time, squat would have occurred), and it is restored to 'SOFT' state before the brake oil pressure control is concluded. As a result, the riding comfort can be kept while controlling the vehicle attitude.

Figure 17A:
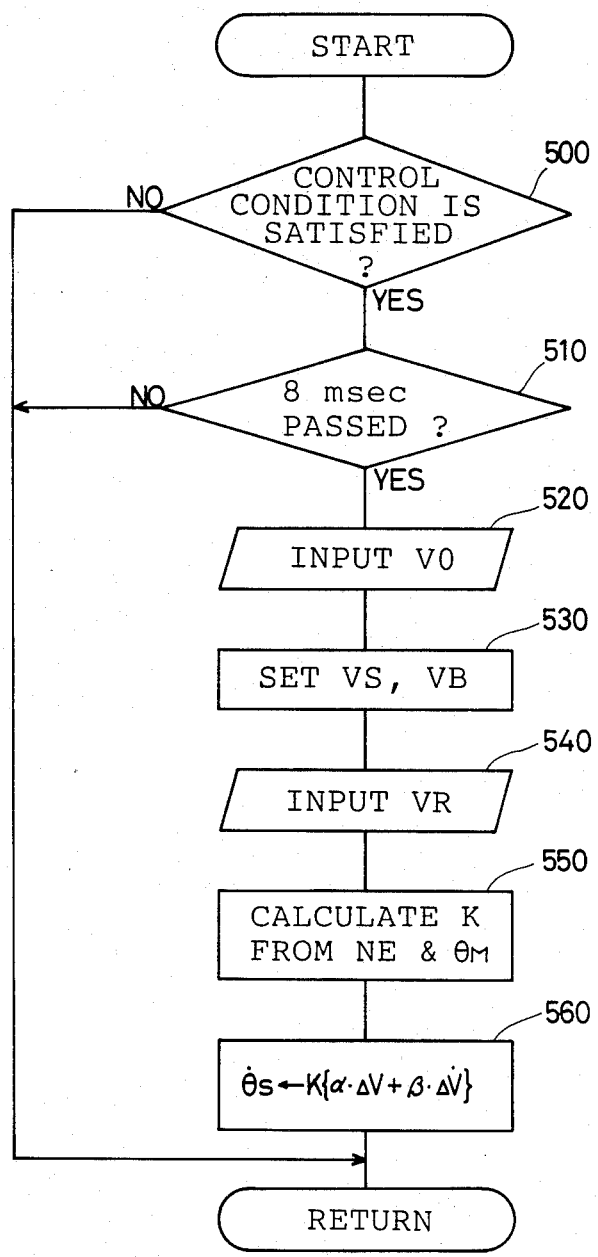
FIGS. 17A and 17B are flow charts showing control processings for a sub-throttle valve control executed in an acceleration slip control circuit in the second embodiment.
Figure 17B:
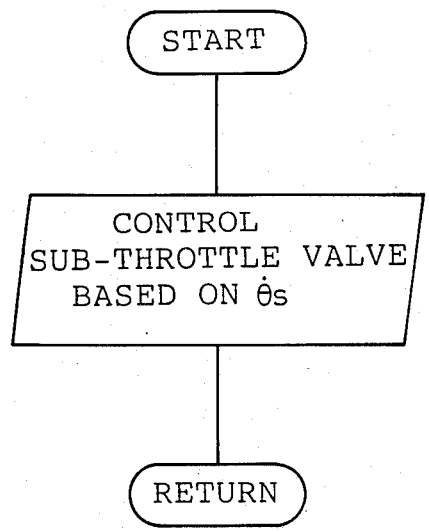
Figure 18:
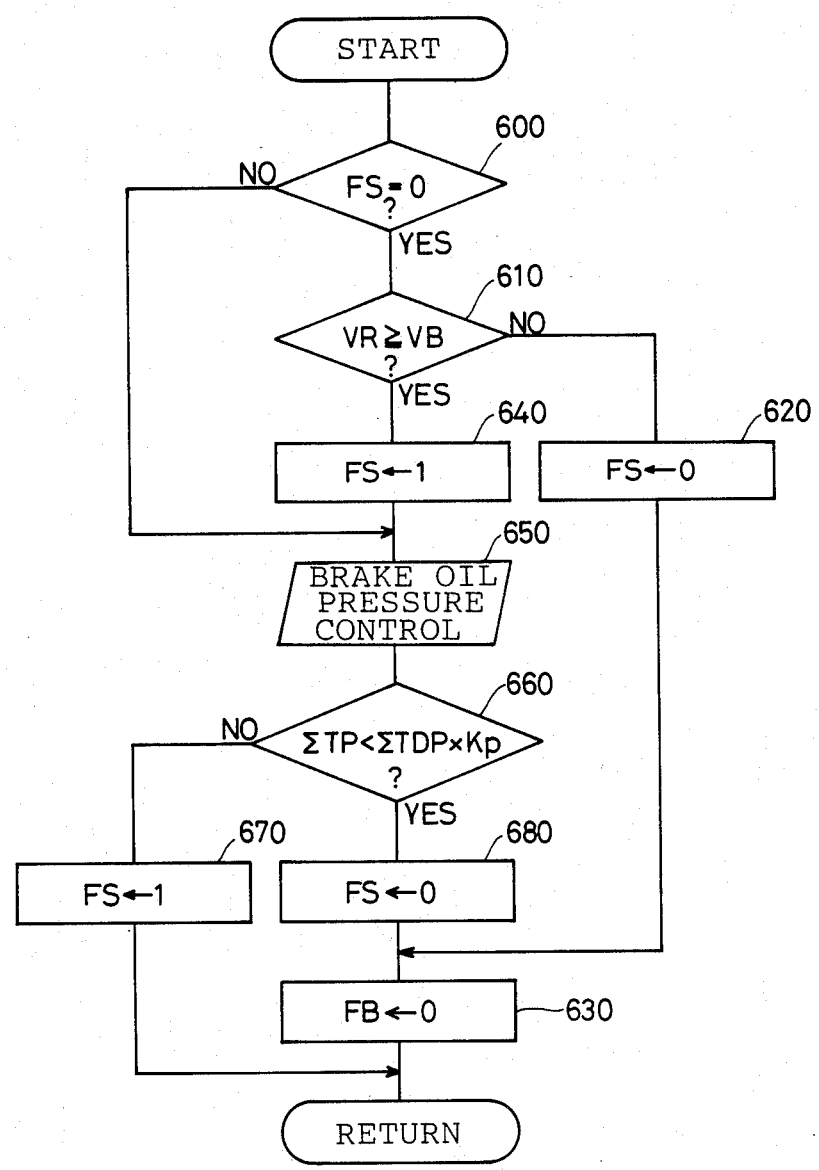
FIG. 18 is a flow chart showing process steps for a brake oil pressure control executed in an acceleration slip control circuit in the second embodiment.

Set forth below is an explanation of the acceleration slip control executed in the acceleration slip control circuit 40, with reference to the flow charts of FIGS. 17A, 17B and 18. FIG. 17A shows an calculation process for calculating a reference value for executing a sub-throttle valve control. FIG. 17B shows an operation process for driving the motor 46 so as to rotate the sub-throttle valve 44 based on the reference value obtained from the calculation of FIG. 17A.

At step 500, it is determined whether or not the condition for executing control is satisfied. The condition is determined to be satisfied when the peripheral speed VR of the drive wheel is greater than the reference value VS for executing the sub-throttle valve control, and also the idle switch is OFF, namely, the main throttle valve is not completely shut off. If the above-mentioned conditions is not satisfied, any control process will not be executed. Even if the conditions is satisfied, the acceleration slip control will not be executed until 8 msec has passed at step 510.

If it is determined that 8 msec has passed at step 510, the vehicle speed VO is inputted at step 520. Here, vehicle speed VO represents the peripheral speed of the follower wheels, i.e., the front wheels 3 and 4. At step 530, the reference value VS for sub-throttle valve control and the reference value VB for brake control are set to be higher than the vehicle speed VO by preset values or preset proportion. The reference value VB is set to be higher than the reference value VS as shown in FIG. 19B. In this embodiment, since the value VS is the target peripheral speed of the drive wheel control, the value VS is set to be higher than the value VO by 12%–20% so as to obtain the highest drive force against the road surface.

At step 540, the peripheral speed VR of the drive wheels, i.e., rear wheels 7 and 8 is inputted. At step 550, a correction coefficient k is obtained from a map of FIG. 20C by a interpolating method. The map shows the relation between the revolution speed NE of the crank shaft detected by the revolution speed sensor of the internal combustion engine and the main throttle valve opening $\theta M$ detected by the throttle position sensor 49a. As apparent from FIG. 20D, the output torque increases sharply when the throttle valve opening is small. The larger the throttle valve opening is, the slower the output torque increases. The output torque hardly changes at an extremely large throttle opening. By controlling the sub-throttle valve opening within smaller opening range, therefore, the responsiveness of the control for closing the sub-throttle valve 44 is preferentially regarded.

At step 560, the value $\dot{\theta}S$ which is a derivative of $\theta S$ (a target value of sub-throttle valve opening) in respect to time is obtained from the following formula:

$$\dot{\theta}S = K\{\alpha \times \Delta V + \beta \times \Delta \dot{V}\},$$

wherein $\alpha$ is a proportional gain, $\beta$ represents a differential gain, $\Delta V$ is a difference between the target peripheral speed VS of the drive wheel and the actual peripheral speed VR of the drive wheel, and $\Delta \dot{V}$ is a derivative of the difference in respect to time. Hereafter, the above-mentioned process is repeatedly executed, and the value $\dot{\theta}S$ is updated.

By utilizing the value $\dot{\theta}S$, the routine shown in FIG. 17B is repeatedly executed every predetermined time interval. Thus, the opening and the opening speed of the sub-throttle valve 44 can be controlled.

An explanation of the brake control is set forth below with reference to FIG. 18.

If brake control is not required because the actual peripheral speed VR of the drive wheel is lower than the target peripheral speed VB of the drive wheel, namely VR < VB, the process steps proceed as follows. First, at step 600, it is determined if the flag FS is reset. If the flag FS is set, it indicates that the brake control is started for controlling acceleration slip. At the initial step in this routine, the flag FS is reset to 0, therefore, the program proceeds to step 610. At step 610, the peripheral speed VR of the drive wheel is compared with the reference value VB which is obtained at step 530. If the value VR is not greater than the value VB, the flag FS is reset at step 520, and the program proceeds to step 630 so as to reset the flag FB. The above-mentioned process steps are repeated until the value VR becomes greater than or equal to the value VB. The flag FB is the same one utilized at steps 400 and 440 in the suspension control routine of FIG. 16.

On the other hand, if the value VR becomes greater than or equal to the value VB at step 610, the brake control is required to be executed as follows.

At step 640, the flag FS is set to 1. Then, the process step proceeds to step 650 so as to start the brake oil pressure control process. This control process is executed based on the following table.

TABLE 1

| Speed | Acceleration | | |
|---|---|---|---|
| | VR ≧ G1 | G2 ≦ VR < G1 | VR < G2 |
| VR ≧ VB | FU | SU | SD |
| VS ≦ VR < VB | SD | SD | FD |
| VR < VS | FD | FD | FD |

G1 ... a predetermined positive acceleration
G2 ... a predetermined negative acceleration
FU ... a process to increase pressure by an acceleration slip control device 301
SU ... a process to gradually increase pressure by an acceleration slip control device 301
FD ... a process to decrease pressure by an acceleration slip control device 301
SD ... a process to gradually decrease pressure by an acceleration slip control device 301

Namely, in the brake control process, the acceleration speed VR of the drive wheel is detected, and if the peripheral speed VR of the drive wheel is greater than or equal to the reference value VB and also the acceleration $\dot{V}R$ is greater than or equal to the value G2, the oil pressure is increased, while on the contrary, the pressure is decreased if VR is less than VB and $\dot{V}R$ is less than G2. Thus, the peripheral speed of the drive wheel can be quickly decreased.

At step 660, it is determined whether or not the current oil pressure is 0. Namely, it is determined if $\Sigma TP$, an integral of the time pressure TP for increasing oil pressure, is less than a product of $\Sigma TDP$ and Kp, where $\Sigma TDP$ is an integral of the time period TDP for decreasing oil pressure, and Kp is a correction coefficient. If the answer is 'YES', the brake oil pressure control is terminated. The correction coefficient Kp is used to adjust the difference of the rate of oil pressure change between the increase control and the decrease control.

If the answer is 'NO' at step 660, that is, if the oil pressure has not been sufficiently decreased, the program proceeds to step 670 at which the flag S is set to 1.

When the excessive acceleration slip has been controlled to a certain degree and the brake oil pressure is decreased, as shown in the condition at a time point t3 in FIG. 19C, the condition at step 660 is affirmed, and the process step proceeds to step 680. At this step, the flag FS is reset. At the following step 630, the flag FB is also reset.

In this embodiment, the suspension characteristic is altered to the 'HARD' state when the brake force is applied to the drive wheels 7 and 8 by the slip control as mentioned in the above so as to prevent the occurrence of squat. The altered suspension characteristic is restored to 'SOFT' state when a predetermined time interval has passed so as to restore riding comfort.

The principle method for the acceleration slip control is the control by the throttle valve 44. For the limited case that the acceleration slip is too excessive to be controlled by the throttle valve 44, the brake oil pressure control is utilized. It can relieve the brake system from excessive load, and moreover, effective acceleration slip control can be realized.

In addition, since the brake oil pressure control is necessarily attended by the suspension control, the occurrence of squat can be prevented any time during initial movement or cruising of the vehicle.

Moreover, highly responsive control is possible by determining an appropriate timing to increase the brake oil pressure so as to alter the suspension characteristic to 'HARD' state before squat is actually occurred.

In the second embodiment, the control by the subthrottle valve 44 has priority to the brake oil pressure control. Namely, the reference value VS for controlling subthrottle valve is set to be lower than the reference value VB for executing brake control. For quick and highly-responsive control, it is possible to set the value VS to be greater than or equal to the value VB.

Furthermore, when the vehicle in travelling on a rough road, it is possible to keep the suspension characteristic in the 'SOFT' state so as to keep riding comfort preceding the acceleration slip control, even though the brake oil pressure control is executed at step 650.

Obviously, numerous modifications and variation of the present invention are possible in light of the above teachings. It is therefore to be understood that within the scope of the opened claims, the invention may be practiced other than as specifically described herein.

What is claimed is:

1. A method for controlling a suspension characteristic of a vehicle having at least one drive wheel, a braking system and suspensions associated with wheels including said one drive wheel, said method comprising the steps of:

detecting a slippage of said one drive wheel of the vehicle;

determining whether or not the detected slippage is greater than a reference value;

controlling a drive force of the drive wheel by means of said braking system when the slippage is determined to be greater than the reference value; and altering an original state suspension characteristic of at least said drive wheel to a harder state when the slippage is determined to be greater than the reference value.

2. A method for controlling a suspension characteristic of a vehicle according to claim 1, wherein the method further comprises a step of restoring the characteristic of the suspension to said original state when a preset time period has passed since said altering step.

3. A method for controlling a suspension characteristic of a vehicle according to claim 1, wherein the drive force of the drive wheel is controlled by said brake system of the vehicle.

4. A method for controlling a suspension characteristic of a vehicle according to claim 2, wherein the drive force of the drive wheel is controlled by said brake system of the vehicle.

5. A method for controlling a suspension characteristic of a vehicle according to claim 1, wherein the slippage is detected by comparing a peripheral speed of the drive wheel with a body speed of the vehicle.

6. A method for controlling a suspension characteristic of a vehicle according to claim 2, wherein the slippage is detected by comparing a peripheral speed of the drive wheel with a body speed of the vehicle.

7. A method for controlling a suspension characteristic of a vehicle according to claim 5, wherein the vehicle has a non-driven wheel and the body speed is detected by detecting a revolution speed of the non-driven wheel.

8. A method for controlling a suspension characteristic of a vehicle according to claim 6, wherein the body speed is detected by detecting a revolution speed of a non-driven wheel.

9. A method for controlling a suspension characteristic of a vehicle according to claim 8, wherein damping force of a shock absorber of at least said drive wheel is increased in order to accomplish the step of altering the suspension characteristic to said harder state.

10. A method for controlling a suspension characteristic of a vehicle according to claim 8, wherein the spring rate of a spring of at least said drive wheel is increased for altering the suspension characteristic to said harder state.

* * * * *